(12) United States Patent
Allen et al.

(10) Patent No.: US 11,088,987 B2
(45) Date of Patent: Aug. 10, 2021

(54) EPHEMERAL GROUP CHAT

(71) Applicant: Snap Inc., Santa Monica, CA (US)

(72) Inventors: Nicholas Richard Allen, West Hollywood, CA (US); Jonathan Brody, Venice, CA (US); Chamal Samaranayake, Venice, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/572,119

(22) PCT Filed: May 4, 2016

(86) PCT No.: PCT/US2016/030694
§ 371 (c)(1),
(2) Date: Nov. 6, 2017

(87) PCT Pub. No.: WO2016/179235
PCT Pub. Date: Nov. 10, 2016

(65) Prior Publication Data
US 2018/0351903 A1    Dec. 6, 2018

Related U.S. Application Data

(60) Provisional application No. 62/157,780, filed on May 6, 2015.

(51) Int. Cl.
*H04L 12/58* (2006.01)
*H04L 12/18* (2006.01)
(Continued)

(52) U.S. Cl.
CPC ............ *H04L 51/34* (2013.01); *G06Q 10/10* (2013.01); *H04L 12/1813* (2013.01); *H04L 51/04* (2013.01); *G06Q 50/01* (2013.01)

(58) Field of Classification Search
CPC ...... G06Q 50/01; H04L 12/1813; H04L 51/04; H04L 51/32; H04L 51/34
(Continued)

(56) References Cited

U.S. PATENT DOCUMENTS 5,754,939 A    5/1998 Herz et al.
6,038,295 A    3/2000 Mattes
(Continued)

FOREIGN PATENT DOCUMENTS

CA       2887596 A1    7/2015
CN     107431632 A    12/2017
(Continued)

OTHER PUBLICATIONS

"European Application Serial No. 16789983.0, Extended European Search Report dated Feb. 1, 2018", 9 pgs.
(Continued)

*Primary Examiner* — Rupal Dharia
*Assistant Examiner* — Adam A Cooney
(74) *Attorney, Agent, or Firm* — Schwegman Lundberg & Woessner, P.A.

(57) ABSTRACT

Methods, devices, systems, and computer readable media with instructions for group text communications between multiple devices, along with communication of associated data and automatic deletion of communications, are described. One embodiment involves generating a first ephemeral group chat, receiving a first ephemeral chat message, associated with one or more deletion triggers, and transmitting the first ephemeral message; and receiving, from at least the second client device, chat monitoring information comprising first deletion trigger information. In various embodiments, coordinated presentation and deletion of ephemeral chat messages are managed in a variety of ways.

21 Claims, 22 Drawing Sheets

(51) Int. Cl.
    *G06Q 10/10*         (2012.01)
    *G06Q 50/00*         (2012.01)

(58) Field of Classification Search
    USPC ........................................................ 709/206
    See application file for complete search history.

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Dröse et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0120744 A1 | 8/2002 | Chellis et al. |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0208802 A1* | 9/2007 | Barman ................ G06Q 10/10 709/203 |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0288319 A1 | 11/2008 | Christensen et al. |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2009/0248751 A1* | 10/2009 | Myman ................ G06Q 10/107 |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0036080 A1 | 2/2012 | Singer et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0254408 A1* | 9/2013 | Sreenivasan ........... G06Q 10/10 709/227 |
| 2013/0290443 A1 | 10/2013 | Collins et al. |
| 2014/0032682 A1* | 1/2014 | Prado ..................... H04L 51/14 709/206 |
| 2014/0122787 A1 | 5/2014 | Shalvi et al. |
| 2014/0201527 A1* | 7/2014 | Krivorot ............. G06F 21/6209 713/168 |
| 2014/0282096 A1* | 9/2014 | Rubinstein .......... G06F 3/04847 715/753 |
| 2014/0325383 A1 | 10/2014 | Brown et al. |
| 2014/0359022 A1 | 12/2014 | Buddenbaum et al. |
| 2014/0359024 A1 | 12/2014 | Spiegel |
| 2014/0359032 A1 | 12/2014 | Spiegel et al. |

(56) References Cited

U.S. PATENT DOCUMENTS

| | | | |
|---|---|---|---|
| 2015/0199082 | A1 | 7/2015 | Scholler et al. |
| 2015/0227602 | A1 | 8/2015 | Ramu et al. |
| 2015/0236990 | A1* | 8/2015 | Shan .................. H04L 51/046 709/206 |
| 2016/0063223 | A1* | 3/2016 | Raley .................. G06F 21/12 705/51 |
| 2016/0085773 | A1 | 3/2016 | Chang et al. |
| 2016/0085863 | A1 | 3/2016 | Allen et al. |
| 2016/0086670 | A1 | 3/2016 | Gross et al. |
| 2016/0099901 | A1 | 4/2016 | Allen et al. |
| 2016/0180887 | A1 | 6/2016 | Sehn |
| 2016/0191442 | A1* | 6/2016 | Penilla .................. H04L 51/22 709/206 |
| 2016/0277410 | A1* | 9/2016 | Kalb .................. H04L 63/102 |
| 2016/0277419 | A1 | 9/2016 | Allen et al. |
| 2016/0321708 | A1 | 11/2016 | Sehn |
| 2016/0359957 | A1 | 12/2016 | Laliberte |
| 2016/0359987 | A1 | 12/2016 | Laliberte |
| 2017/0161382 | A1 | 6/2017 | Ouimet et al. |
| 2017/0263029 | A1 | 9/2017 | Yan et al. |
| 2017/0287006 | A1 | 10/2017 | Azmoodeh et al. |
| 2017/0295250 | A1 | 10/2017 | Samaranayake et al. |
| 2017/0374003 | A1 | 12/2017 | Allen et al. |
| 2017/0374508 | A1 | 12/2017 | Davis et al. |

FOREIGN PATENT DOCUMENTS

| | | |
|---|---|---|
| GB | 2512140 A | 9/2014 |
| KR | 20130021226 | 3/2013 |
| KR | 102174086 B1 | 10/2020 |
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | 2016065131 | 4/2016 |
| WO | WO-2016054562 A1 | 4/2016 |
| WO | 2016/112299 | 7/2016 |
| WO | 2016179166 | 11/2016 |
| WO | WO-2016179235 A1 | 11/2016 |
| WO | WO-2016179235 A8 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"International Application Serial No. PCT/US2016/030694, International Preliminary Report on Patentability dated Nov. 16, 2017", 10 pgs.

Castelluccia, Claude, et al., "EphPub: Toward robust Ephemeral Publishing", Network Protocols (ICNP), 2011 19th IEEE International Conference on, IEEE, (Oct. 17, 2011), 18 pgs.

Fajman, "An Extensible Message Format for Message Disposition Notifications", Request for Comments: 2298, National Institutes of Health, (Mar. 1998), 28 pgs.

Melanson, Mike, "This text message will self destruct in 60 seconds", readwrite.com, [Online]. Retrieved from the Internet: <http://readwrite.com/2011/02/11/this_text_message_will_self_destruct_in_60_seconds>, (Feb. 18, 2015), 4 pgs.

Vaas, Lisa, "StealthText, Should You Choose to Accept It", [Online]. Retrieved from the Internet: <URL: http://www.eweek.com/print/c/a/MessagingandCollaboration/StealthTextShouldYouChoosetoAcceptIt, (Dec. 13, 2005), 2 pgs.

Sawers, Paul, "Snapchat for iOS Lets You Send Photos to Friends and Set How long They're Visible For", [Online]. Retrieved from the Internet: <http:/ /thenextweb.com/apps/2012/05/07/Snapchat-for-ios-lets-you-send-photos-to-friends-and-set-how-long-theyre-visiblefor/#! xCjrp>,, (May 7, 2012), 5 pgs.

Shein, Esther, "Ephemeral Data", Communications of the ACM vol. 56 | No. 9, (Sep. 2013), 20-22.

"European Application Serial No. 16789983.0, Communication Pursuant to Article 94(3) EPC dated Oct. 8, 2018", 8 pgs.

"Korean Application Serial No. 10-2017-7034975, Office Action dated Nov. 29, 2018", w English Translation, 17 pgs.

"International Application Serial No. PCT/US2016/030694, International Search Report dated Jul. 27, 2016", 2 pgs.

"International Application Serial No. PCT/US2016/030694, Written Opinion dated Jul. 27, 2016", 8 pgs.

Leyden, John, "This SMS will self-destruct in 40 seconds", [Online]. Retrieved from the Internet: <URL: http://www.theregister.co.uk/2005/12/12/stealthtext/,(Dec. 12, 2005), 1 pg.

"European Application Serial No. 16789983.0, Response Filed Feb. 14, 2019 Communication Pursuant to Article 94(3) EPC dated Oct. 8, 2018", 3 pgs.

"Korean Application Serial No. 10-2017-7034975, Final Office Action dated May 29, 2019", w/ English Translation, 5 pgs.

"Korean Application Serial No. 10-2017-7034975, Response Filed Jan. 29, 2019 to Office Action dated Nov. 29, 2018", w/ English Claims, 24 pgs.

"Korean Application Serial No. 10-2017-7034975, Response filed Jul. 1, 2019 to Final Office Action dated May 29, 2019", w/ English Claims, 20 pgs.

"European Application Serial No. 16789983.0, Summons to Attend Oral Proceedings dated Nov. 13, 2019", 9 pgs.

"Korean Application Serial No. 10-2019-7029234, Notice of Preliminary Rejection dated Jan. 2, 2020", w/ English Translation, 16 pgs.

"Chinese Application Serial No. 201680014831.1, Office Action dated Dec. 4, 2019", W/Englih Translation, 9 pgs.

"Korean Application Serial No. 10-2017-7034975, Final Office Action dated Aug. 2, 2019", w/ English Translation, 9 pgs.

"Chinese Application Serial No. 201680014831.1, Office Action dated Aug. 5, 2020", w/ English Translation, 9 pgs.

"Chinese Application Serial No. 201680014831.1, Response filed Oct. 20, 2020 to Office Action dated Aug. 5, 2020", w/ English Claims, 17 pgs.

"Chinese Application Serial No. 201680014831.1, Response filed Mar. 27, 2020 to Office Action Dec. 4, 2019", w/ English Claims, 38 pgs.

"European Application Serial No. 16789983.0, Decision to Refuse a European Patent Application dated Jul. 2, 2020", 18 pgs.

"European Application Serial No. 16789983.0, Response filed Mar. 31, 2020 to Summons to Attend Oral Proceedings dated Nov. 13, 2019", 13 pgs.

"Korean Application Serial No. 10-2019-7029234, Response filed Mar. 2, 2020 to Notice of Preliminary Rejection dated Jan. 2, 2020", w/ English Claims, 29 pgs.

"Korean Application Serial No. 10-2020-7031274, Notice of Preliminary Rejection dated Jan. 28, 2021", w/ English Translation, 7 pgs.

"Chinese Application Serial No. 201680014831.1, Decision of Rejection dated Mar. 3, 2021", w/ English translation, 11 pgs.

* cited by examiner

EPHEMERAL GROUP CHAT

CLAIM OF PRIORITY

This Application is a U.S. National Stage Filing under 35 U.S.C 371 of International Patent Application Serial No. PCT/US2016/030694, filed May 4, 2016, and published on Nov. 10, 2016 as WO2016/179235, which claims the benefit of priority of U.S. Provisional Application Ser. No. 62/157,780, filed May 6, 2015, the benefit of priority oc each of which is claimed hereby and each of which are incorporated by reference herein in their entirety.

TECHNICAL FIELD

Embodiments pertain to group text communications between multiple devices, along with communication of associated data and automatic deletion of communications for improved data security.

BACKGROUND

Online chat refers to communications via a network with real-time transmission of text messages between users. These messages are generally short in order to enable participants to respond quickly, thereby creating the feeling of a conversation. Such communications are often between two users, and structured as point-to-point communications, but can also be multicast or structured as group communications. In many chat systems, data is not stored securely.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
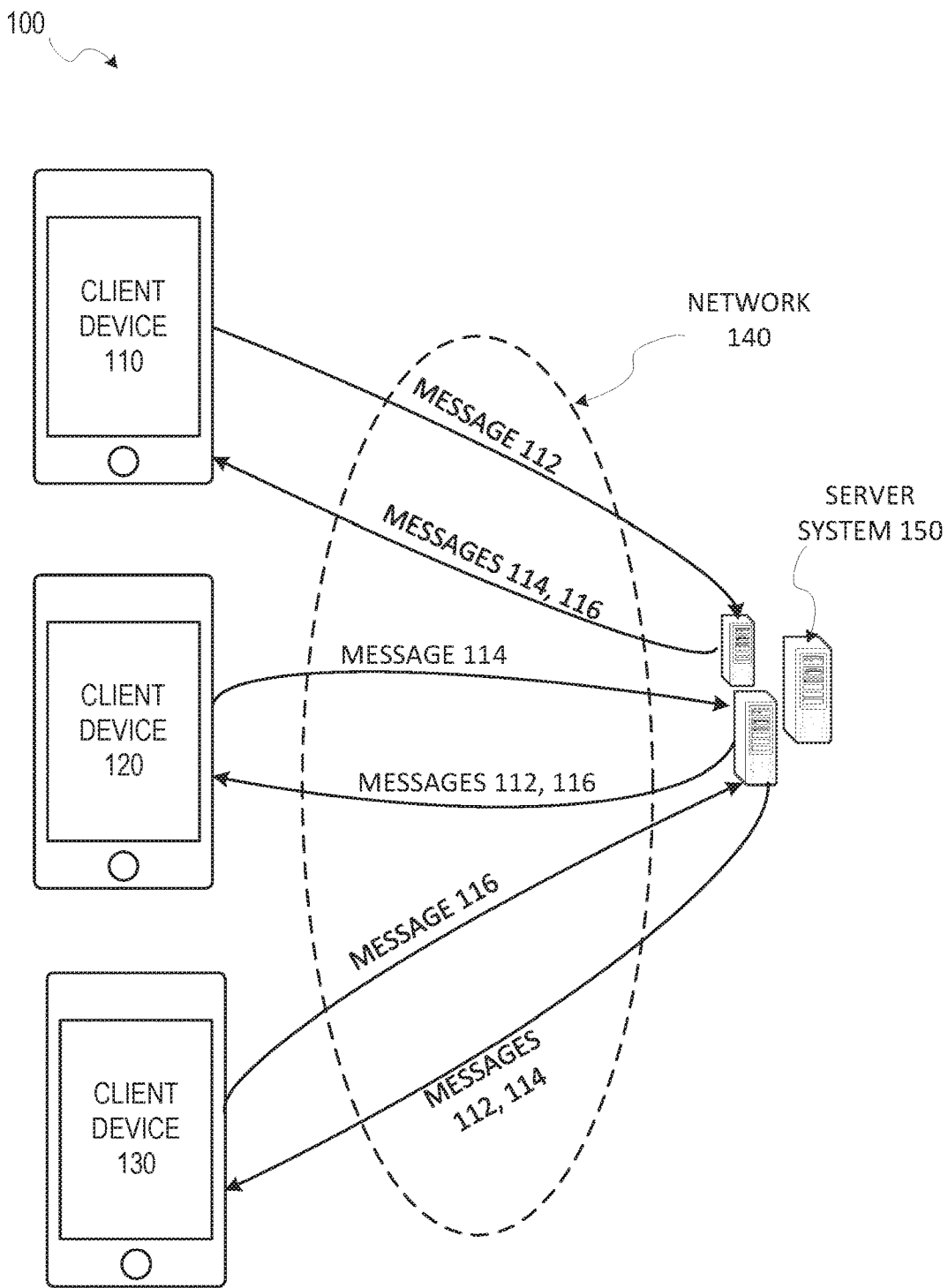
FIG. 1 is a block diagram illustrating a networked system, according to some example embodiments.

Embodiments described herein pertain to group text communications between multiple devices, additional communications in support of text communications, and automatic deletion of messages (e.g., ephemeral messages) in a group chat context. Some embodiments may operate in the context of a social networking environment where client devices may not only chat (e.g., send text messages) but may also send ephemeral photographs and video clips to groups of friends. In this context, a friend is a user account associated with one or more devices that has been associated with another account, either by a friend request and response, or some other such association method.

Example embodiments allow users to create a group chat with their friends up to a threshold number of friends in a single group chat screen. Users are able to create groups from an overall feed user interface (UI), such as a list of current groups and users that have initiated messages to a user's devices or a "send to" UI (e.g., a UI for initiating a message or content communication to one or more other users.) Additionally, "presence" and "receipt" information allow users to know when their friends are present in the chat and interacting with user messages via an interface presented at a user's device. Such presence and receipt information is, in some embodiments, used to determine when an ephemeral chat message should be deleted for all members of a group chat. In other embodiments, other information is shared by users to determine when an ephemeral chat message should be deleted for all users.

In one embodiment, a threshold number of user accounts can be added to a group chat, (e.g., eight users, ten users, etc.) Users can leave or be added to the group, either by an action of a user alone or by an invitation by an initial user and a response from a joining user. In other embodiments, votes from various threshold numbers of users within a group may be used to add or remove group members. A particular set of users may have more than one group chat active for that set of users at one time (e.g., group chats can be copied or renamed). In other words, an overview interface showing a cell for each active group chat may have different cells for a first group and a second separate group, where the members of the first and second group are identical. In certain embodiments, the second group may be generated by copying the first group and giving the second group a new name to distinguish it from the first group.

In some embodiments, once everyone in a group has viewed a particular message that is part of a group chat for a threshold amount of time, the message is cleared for all group members. In various embodiments, a variety of deletion triggers other than all group members meeting a threshold viewing time may be used, as described in more detail below. In some embodiments, multiple deletion triggers are used (e.g., two triggers with an overall time since the message was sent plus a threshold number of group members viewing the message for a threshold viewing time.) In other embodiments, multiple deletion triggers are possible for a single message, with the message deleted when a trigger condition for any of the multiple possible deletion triggers is met.

FIG. 1 is a block diagram illustrating a networked system 100 according to some example embodiments. System 100 includes client devices 110, 120, and 130 as well as server system 150, and network 140. Network 140 is used to convey communications between client devices 110, 120, 130 and the server system 150. Client devices 110, 130 and 120 may be any smartphone, tablet, phablet, laptop computer, network-enabled camera, or any other such network enabled device. Client devices 110, 120, 130 may include a keyboard or touchscreen for entering text information, as well as a camera device for capturing additional content that may be part of a supplemental (e.g., non-text) communication between users or members of a group. Client devices 110, 120, 130 are connected to server system 150 via network 140. The network 140 may include any combination of wired and wireless connections. This may include cellular access networks, access point interfaces to the internet, or any other such networks 140 or network elements. For example, client device 110 may interface with network 140 using a Long Term Evolution (LTE) cellular network to communicate with server system 150, while client device 120 may use a Wi-Fi access point to interface with network 140 and communicate with server system 150. Server system 150 may be one or more computing devices as part of a service or network computing system. In certain embodiments, particularly embodiments with large numbers of client devices 110, 120, 130 interfacing with a server system 150 from widely different locations all over the globe, server system 150 may be a distributed network 140 of server computers that are similarly widely distributed, and which communicate with each other via network 140. In some embodiments, client devices 110, 120, 130, as well as any elements of server system 150 and network 140, may be implemented using elements of software architecture 902 or machine 1100 described in FIGS. 9 and 11.

Networked system 100 then may be used in communication of messages between client devices 110, 120, 130. In the embodiment discussed below, client devices 110, 120, and 130 are each associated with a different user account, and each of these user accounts for devices 110, 120, and 130 have joined a group. The devices send messages to the group via network 140 and system 150, and receive messages from the group via the same route. As shown in FIG. 1, client device 110 communicates content message 112 to server system 150, and client device 110 receives messages 114 and 116 from devices 120 and 130. Similarly, device 120 sends message 114 and device 130 sends message 116. All of the devices are associated with a single group, and the messages 112, 114, and 116 are sent as group chat, so server system 150 directs each message so that every member of the group has a copy of each message.

Each device then includes a feed interface that may be part of an application operating on the respective client device. When chat messages are received, a notifier appears in the feed, and a group chat, individual chat, or other message may be accessed. A selection within the feed may navigate a user to a chat view.

Figure 2A:
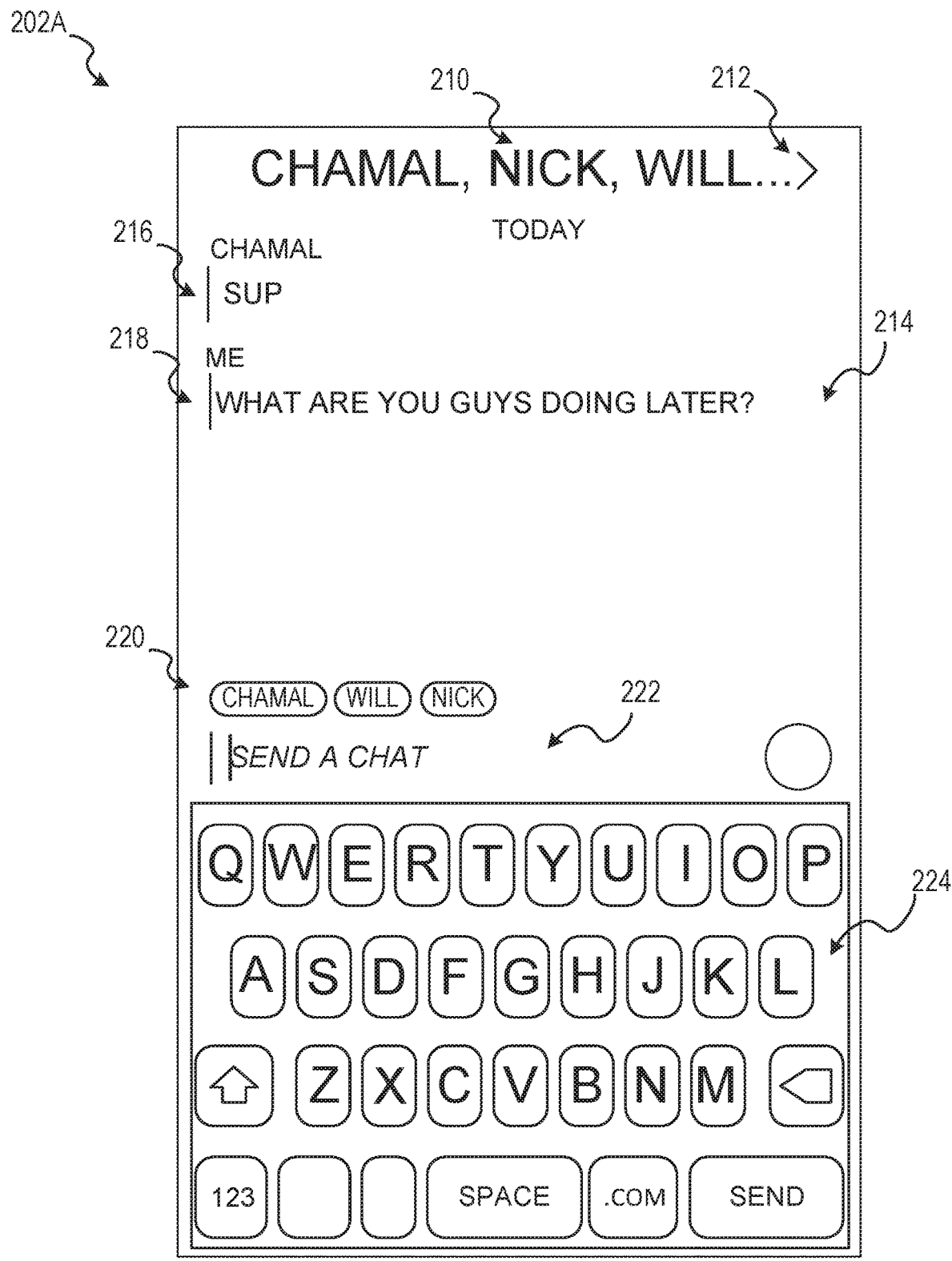
FIGS. 2A-C illustrate aspects of ephemeral group chat, in accordance with certain example embodiments.
Figure 2B:
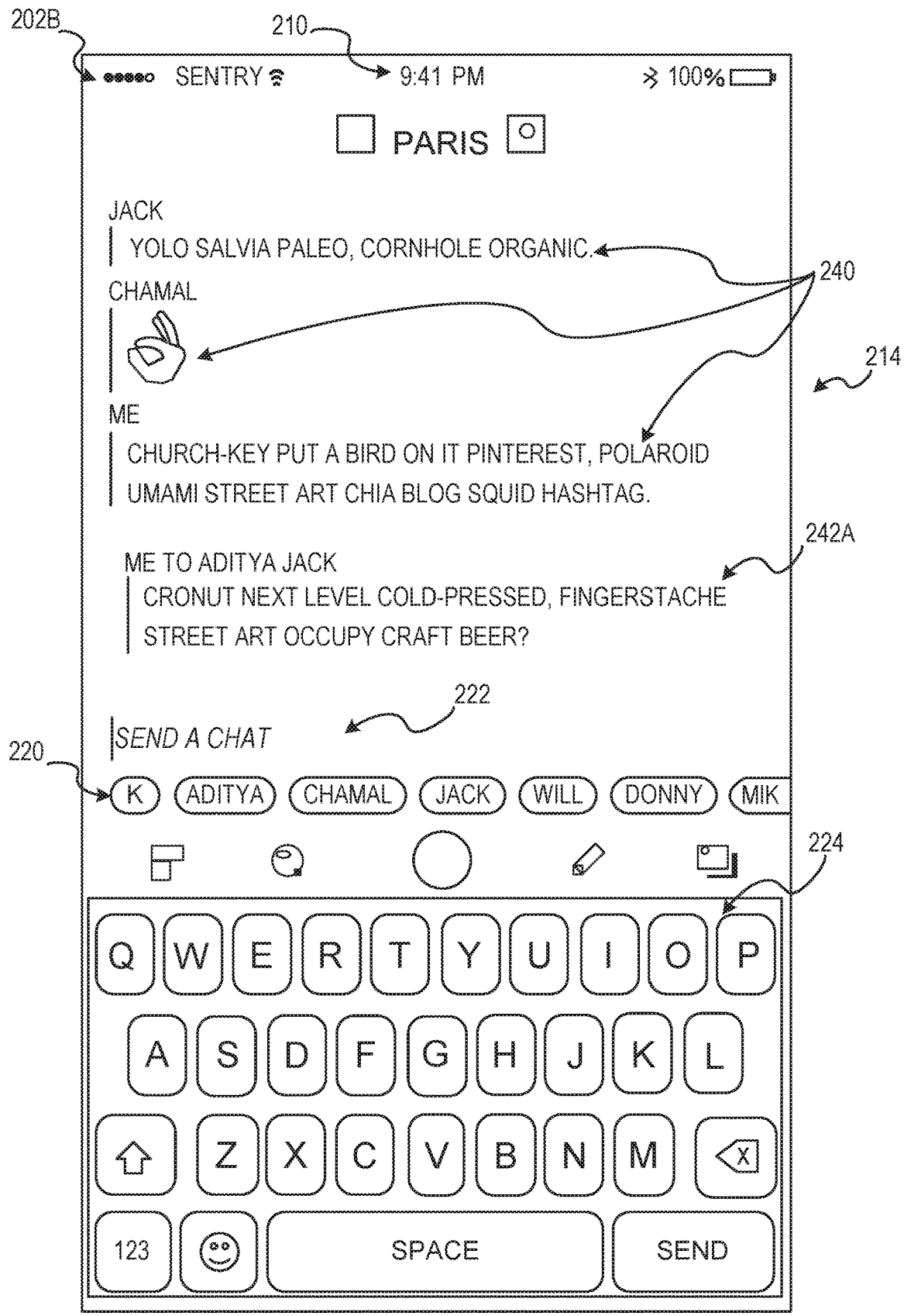
Figure 2C:
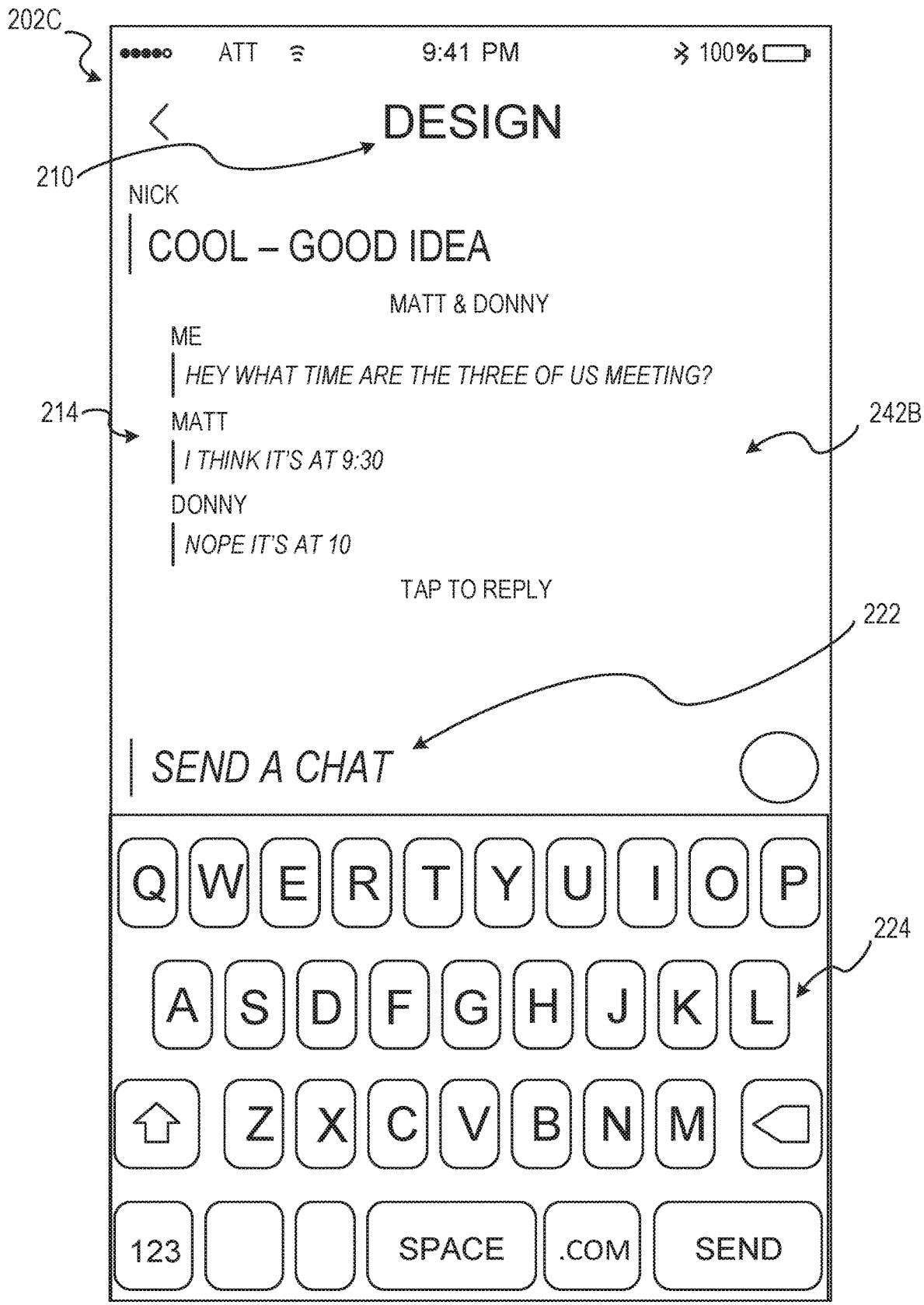

FIGS. 2A-C illustrate aspects of ephemeral group chat, in accordance with certain example embodiments. FIGS. 2A-C illustrate aspects of a chat view 202 that may be used as part of a messaging client application such as messaging client application 804 operating on a client device. This includes client devices such as example client devices 110, 120, and 130 of FIG. 1, and mobile device 1000 of FIG. 10, where a chat view 202 may be presented with display area 1002. Chat view 202A of FIG. 2A includes a header 210 with a chat title next to a top right arrow 212. In some embodiments, interacting with a UI displayed by chat view 202 by tapping the top right arrow 212 button of the interface navigates back to the feed described briefly above. The example embodiment of FIG. 2A with the title in the header 210 shows the first names or identifiers of the user accounts in the group chat. Names may be associated with user accounts by the user account controller, or by an individual user (e.g., by assigning names as aliases in a friend list.) In other embodiments, other details may be used in a header 210 of a group chat view 202. In some embodiments, if there are too many names, the first few names are shown followed by an ellipsis. The ordering of the names may be dictated by the order of joining the group, or in any other order allowed by the system. In some embodiments, tapping a touch target of the user interface (UI) associated with the header 210 reveals a UI dropdown, which is discussed in more detail below with respect to FIG. 3.

In chat view 202A, chat flow 214 includes two ephemeral chat messages 216 and 218. Presence indicators 220 lists group members, and may include indicators as to which group members are currently in a chat view 202 for the shared group chat on devices associated with user accounts corresponding to the presented names or user account names shown by presence indicators 220. In some embodiments, for example, colors associated with a user account may brighten or be displayed when a chat system has received a presence information from a user device associated with a user account within a certain time frame indicating that the user is displaying or interacting with chat view 202. When the chat system has not received a presence communication within a certain time frame, a name or account identifier of presence indicators 220 may indicate this as well (e.g., by greying out the associated name or account identifier). Chat entry area 222 shows text or other content for an ephemeral chat message before the message is sent. Data entry interface 224 is a portion of chat view 202 for entering information for an ephemeral chat message, such as the software keyboard illustrated by FIG. 2A. In other embodiments, this may be a voice-to-text interface, or any other such interface for assisting with input for an ephemeral chat message.

In addition to the ephemeral chat messages shown within chat flow 214, other status or presence messages may be displayed. This includes receipt messages, presence notifications, information related to deletion triggers or criteria, or any other such information. For example, a chat interface may also have notifications. These chat notifications as part of the embodiment with chat flow 214 may include:

---
-Typing
-[display name] is typing in [group name]...
-Push
-"From [display name] in [group name]"
-In App
-"<chat icon> [group name]"
-secondary text: "[display name]"

---

In other embodiments, other chat notifications may be used.

In some embodiments, content communications (e.g., image and video communications) are also presented in chat flow 214, and in some such embodiments have associated notifications as part of a display interface for these content communications. Examples of such notifications include:

---
-Push
-"From [display name] in [group name]"
-In App
-"<icon> [group name]"
-secondary text: "[display name]"

or any other such notifications in various embodiments.

In addition to these notifications for text or content communications, other notifications may be used by a system. For example, certain notifications may be provided for users joining or leaving a group. Additionally, some embodiments may enable a user to block communications from another specific user or group of users. Notifications may be provided when a user is initially blocked, and notifications may be provided when communications are not received because a user has previously blocked a user sending a current message. Specific details of such notifications may vary between different implementations and may be selectable and customizable by different users.

In addition to allowing group chat within a UI of chat view 202, certain embodiments may enable chat between only a portion of members of a group within the same chat flow, as illustrated by FIGS. 2B and 2C. Thus, certain embodiments include systems and methods for a user taking part in a group chat to have a private conversation with one or more of the members of the group without the knowledge of the rest of the group. Such embodiments include the private messages appearing independently of the group conversation of chat flow 214. In certain embodiments, a user can "scroll" within the private conversation and the group conversation independently within chat flow 214 even if they are both on the main or only display. For example, in such embodiments, if a private chat flow within chat flow 214 exceeds a certain size, number of messages, or number of lines, a scrollable interface within chat flow 214 is presented. If the overall chat flow 214 is similarly larger than a threshold size that fits within chat flow 214, then a user may scroll messages within chat flow 214, and may also scroll within a sub area that presents only a portion of the private group chat messages represented by private group chat 242A.

In the embodiment illustrated by FIG. 2B, the chat messages 240 shown as beginning at the left margins are messages shared with all of the members of the group. During group chat, a user can select one or more members of the group for a private group chat 242A message, and that private "whisper" message will be sent only to those selected group members. The private group chat 242A message is displayed as part of the group message flow in chat view 202, but with an indent to show that the private group chat 242A message is not shared with the entire group. Such a private group chat 242A whisper message may be initiated by, for example, touching the names of recipients in the display to add them to a whisper sub-group. In some embodiments, if messages between the sub-group exceed a certain length, then another sub-flow may be embedded within chat flow 214 for the messages between members of the sub-group. The example of FIG. 2B shows a message from a user "JACK" to the whole group, followed by a message from user "CHAMAL" to the whole group, followed by a message from a user associated with the displayed interface, labeled as "ME," and sent to the whole group, followed by a private whisper message from the device user "ME" to group members "ADITYA" and "JACK." As illustrated, the final message, which is a private whisper message, is illustrated as indented in the group message flow, while the group messages above are shown at the left margin.

Additionally, as detailed herein, group messaging may use color assignments for each user in a group. In certain embodiments, colors may only be displayed for a portion of the users. In FIG. 2B, group members "WILL" and "DONNY" have their names listed as group members, but may not be shown with an associated color. This may be implemented so that only users that have participated in a group by sending a message have their colors displayed. This may also be implemented such that only user names that are currently part of the interface have a color displayed. This may also be implemented such that all invited group members have their names displayed, but only group members that have responded to an invitation to join a group have a color associated and displayed as part of the group interface. In other embodiments, other color association and user interface displays may be used.

FIG. 2C illustrates another example of a message flow for private group chat 242B whisper messages within the group chat flow 214 area. Just as described above with respect to FIG. 2B, the private group chat 242B messages are shown indented from the leftmost margin where group message are shown. In the example of FIG. 3C, the private group chat 242B whisper messages are not only indented, but a title or whisper message header is also shown with information about recipients of the private message. In some embodiments, an interface area below the most recent whisper message allows a single tap input to begin a whisper message to the established sub-group from a previous whisper message. Below this, a "send a chat" user interface area allows a single touch to begin entering a message to the entire group. The message chat flow 214 may be structured to show all messages by time, but with private whisper messages and group messages interwoven in the same flow. A swipe input up and down on the sub-group message display area may allow a user to scroll up or down to different private whisper messages to initiate a private whisper reply.

Additionally, in certain embodiments, an independent scroll area for the private whisper communications may be included. For example, in the embodiment of FIG. 2C, if a user swipes up or down in the area below the "MATT & DONNY" header and above the "TAP TO REPLY" area, the message display for the private whisper message history will scroll up and down if there are more messages than fit in the whisper display area, while the group messages are stationary. In other embodiments, where a group message is presented below the private whisper message area, the user interface swipe area may be in the area where text for the private whisper messages is presented. If multiple different private whisper messages are part of the same user interface display, these may each have separate whisper display areas. For such an embodiment, each separate area will scroll to a history of their separate independent whisper messages if a swipe input is received at the user interface.

Thus, as described above, a user can have a combination of two or more group chats or private conversations open on the same screen. Embodiments with such a single screen may have multiple layers of privacy (e.g., a group chat with six people, a private conversation with four of the six, and another private conversation between two of those four).

Figure 3:
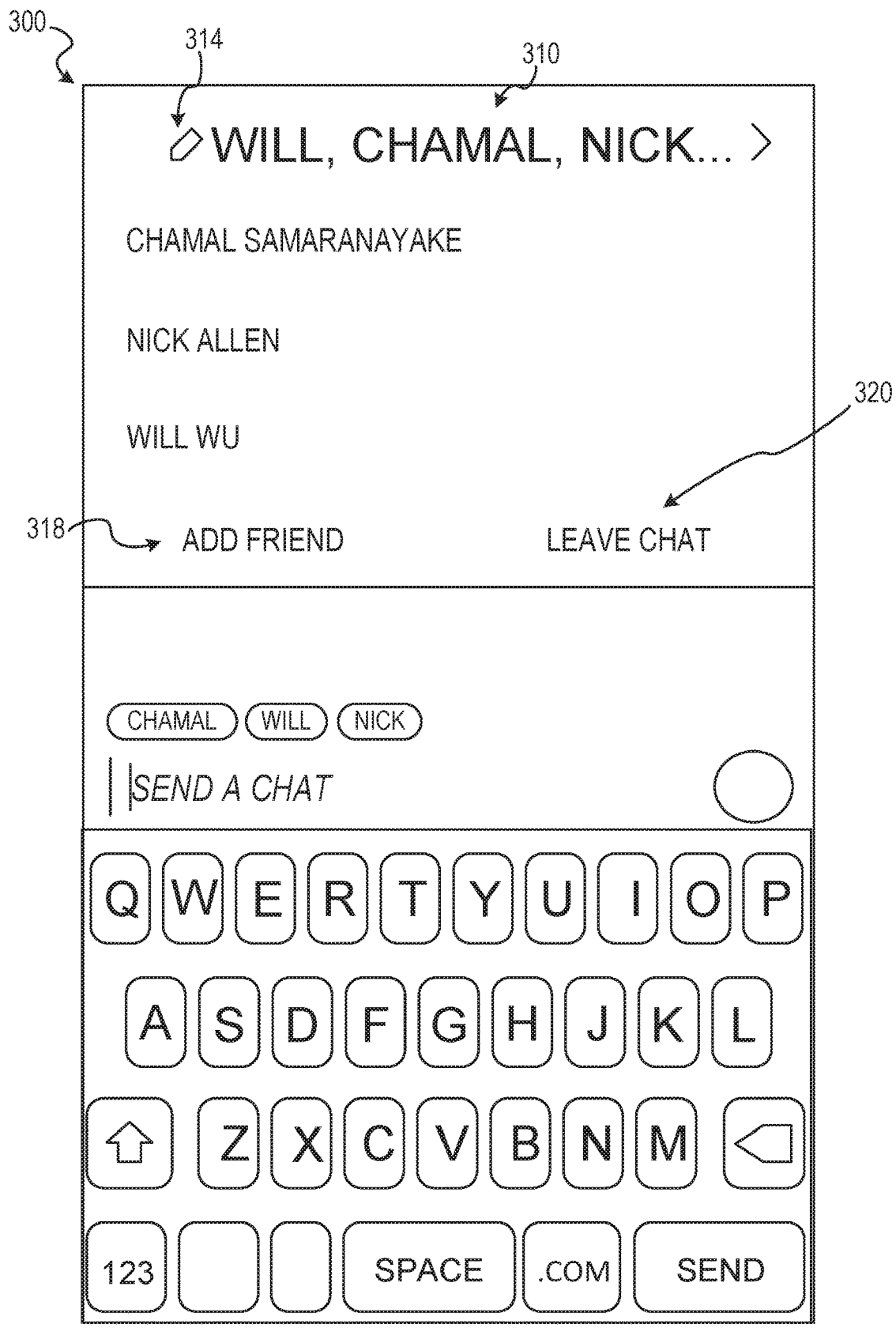
FIG. 3 illustrates aspects of ephemeral group chat and an associated user interface, in accordance with certain example embodiments.

FIG. 3 illustrates aspects of ephemeral group chat, in accordance with certain example embodiments, and shows an example of a user interface 300. Entering this state reveals an edit icon 314 to the left of the header 310. Tapping this icon allows the user to set the group name that is applied to all users. If a user changes the group name displayed in header 310, it is added to the group chat UI and text similar in style to the date text is dropped into the chat:

"[display name] named the group [new group name]"
"You named the group [new group name]"

In some embodiments, renaming the group allows for a group name of 16 characters. Within the dropdown is a list of users' names (e.g., user account identifiers) in the group chat. In some embodiments, each user name is a different group chat color. Tapping the name of a user navigates into a chat with that user. If the user has associated symbols (e.g. emoji, friendmojis, symbol, etc.) they are displayed at the right hand portion of the corresponding cell. At the bottom of the dropdown are options to add a user to the group and to leave the group.

For adding a user to the group, various actions may be used in different implementations. Selecting an add user area of a UI takes a user to a list of friends that are not in the group chat. This may be a communication and response between a client device and a server system (e.g., a friend list is transmitted from the server to the client device) or may use a friend list stored in a client device. When the friend list is displayed, a user can tap multiple names from the friend list to add them to the group. In some embodiments, a maximum group size may be implemented.

A user may also use a UI to leave a group. When leaving a group, a user's saved items are unsaved (and deleted). Unviewed snaps and chats that a user has received are marked as read. Unviewed snaps that a user has sent remain in the chat until they are viewed by each member of the group, and then the chat messages disappear from each user's client device. In other words, unviewed chats that a user has sent remain in the chat until they are viewed such that normal clearing logic applies for other users after a group member has left the group.

A message is initially entered at a client device and is sent to devices associated with each user account that is part of a group chat after a user enters a command to send the message. A server system then sends the messages to the appropriate client devices. The devices then maintain the messages and delete the messages for all users after each user has viewed the chat. In some embodiments, a message may be deleted (e.g., after a deletion period of time) even if it has not been viewed. A message may be considered as having been viewed when the message has been presented on the screen for a certain period of time, when a user has checked the message as viewed, or based on any other such system criteria associated with presentation of a message to a user of a client device. If more than one client device is associated with a single user account, a client device displaying the message may send a message to the server system indicating that the message was viewed, and the server system can send a message indicating that the message is to be deleted at the appropriate time after the message has been viewed by all members of a group chat.

In certain embodiments, any user can save a chat message or all chat messages in a group chat. A visual indicator may be provided on a client device indicating that a user has saved one or more messages or that another member of a group has saved one or more messages in a group chat. One such indicator may be a change in color of a color bar around a user's ID in a presented UI. Another indicator may be a thickness of a line around a user's identifier (ID) in a presented user interface (UI). In certain embodiments, an overscroll input to a UI will reveal a time stamp with a colored dot of the same color for all users that have saved the content.

In certain embodiments, if a user takes a screenshot, text similar in style to the date text is dropped into the chat with a message "[first name] took a screenshot of Chat!," and "You took a screenshot of Chat!" may be presented on the display of a client device for the user that screenshotted the chat. Such a message may be presented for screenshots taken during group chat as well as screenshots taken on one-to-one chats. In such embodiments, a messaging client application may send a message with presence information to a server computer identifying that a screen capture was taken, and this information is sent to all members of the group chat to be displayed as an update within a chat flow. Similarly, in various embodiments, such a messaging client application captures various information about a user's interactions with a user interface and display of chat messages, and sends chat monitoring information to a server computer. The server computer may use this information to determine when chat messages are to be deleted, and when various updated and presence messages are to be displayed via screens of devices.

In various embodiments with a feed or flow interface as described above, messages or content that have previously been viewed by a user appear above a fold in the UI in all devices associated with the user's account. When a content communication (e.g., an image or video clip) is received at a client device as part of a chat and is presented as part of the chat flow, the receiving user can only view the content once. If a receiver screenshots the content, text similar in style to the date text is dropped into a chat of the sender, right below the content as presented to each user in a group chat, indicating that a particular viewer has screenshotted it. This screenshot message is only visible to the sender of the content.

In addition to a screenshot notification to a content communication sender, a sender may additionally receive a receipt indicating that the content was delivered, and a receipt indicating that the content was opened/viewed. For video clips, the notification may indicate if only part of the video clip was viewed. For an image with a time limit on viewing, a receipt may indicate how much of the viewing time has been used. The content received/opened receipt and possible screenshot notification for an individual user disappears after the user has swiped into a chat flow from a higher level UI interface and viewed the associated receipt.

In some embodiments, a sender sees a sent receipt in a chat flow until all people in the group chat have viewed the sent content. The sent receipt provides an "opened" notification when one or more other recipient users have viewed the content. In certain embodiments, a sender can view who has seen the content by pulling right to left on a touchscreen UI to reveal a list of the content read receipts for all other users in a group. In one example implementation, such content read receipts are indicated by a colored dot, where the color corresponds with the color of the user who has viewed the content. After all users have viewed the content, the read receipt remains until the sender has seen the chat view in the state where all receivers have viewed the content. After the sender enters the chat when the content has been viewed by all other group members, the receipt is released.

In one example embodiment, the sender can see who has taken a screenshot via text similar in style to the date text (e.g., "Today") directly under the content receipt. For example:

"[first name] took a screenshot!"

or if multiple people took a screenshot:

"[first name], [first name], [first name], & [first name] took a screenshot!"

The screenshot text is released along with a content_sent_opened icon. When a user enters or leaves a chat group, an indicator message is shown in the same style as the date headers illustrated in FIGS. 2 and 5 (e.g. "today.") Example indicator messages include:

[first name] has left
and
[first name] was added by [first name of adder].

In such an embodiment, the indicator message text follows chat read logic for being released and removed from a chat flow and client device.

When a user leaves a chat, for example by selecting a leave chat interface 320, the chat messages on devices associated with that user account are unsaved (e.g., deleted for all associated user devices when possible, such as after connection with the server computer after power-on or after running a messaging client application on a device that had previously received an ephemeral chat message.) In some embodiments, such a leave chat interface 320 includes additional warnings that chat messages will be inaccessible to the user account after leaving the group chat, but will be available to other users. Unviewed snaps and chats that the leaving user has received are marked as read for the purpose of any deletion triggers associated with the leaving user account. Unviewed chat messages that the user has sent remain in the chat flow of other users devices until they meet deletion criteria, then disappear from the chat flow of all users. In some embodiments, users accounts may similarly be added to a group chat by selecting add friend interface 318.

Figure 4:
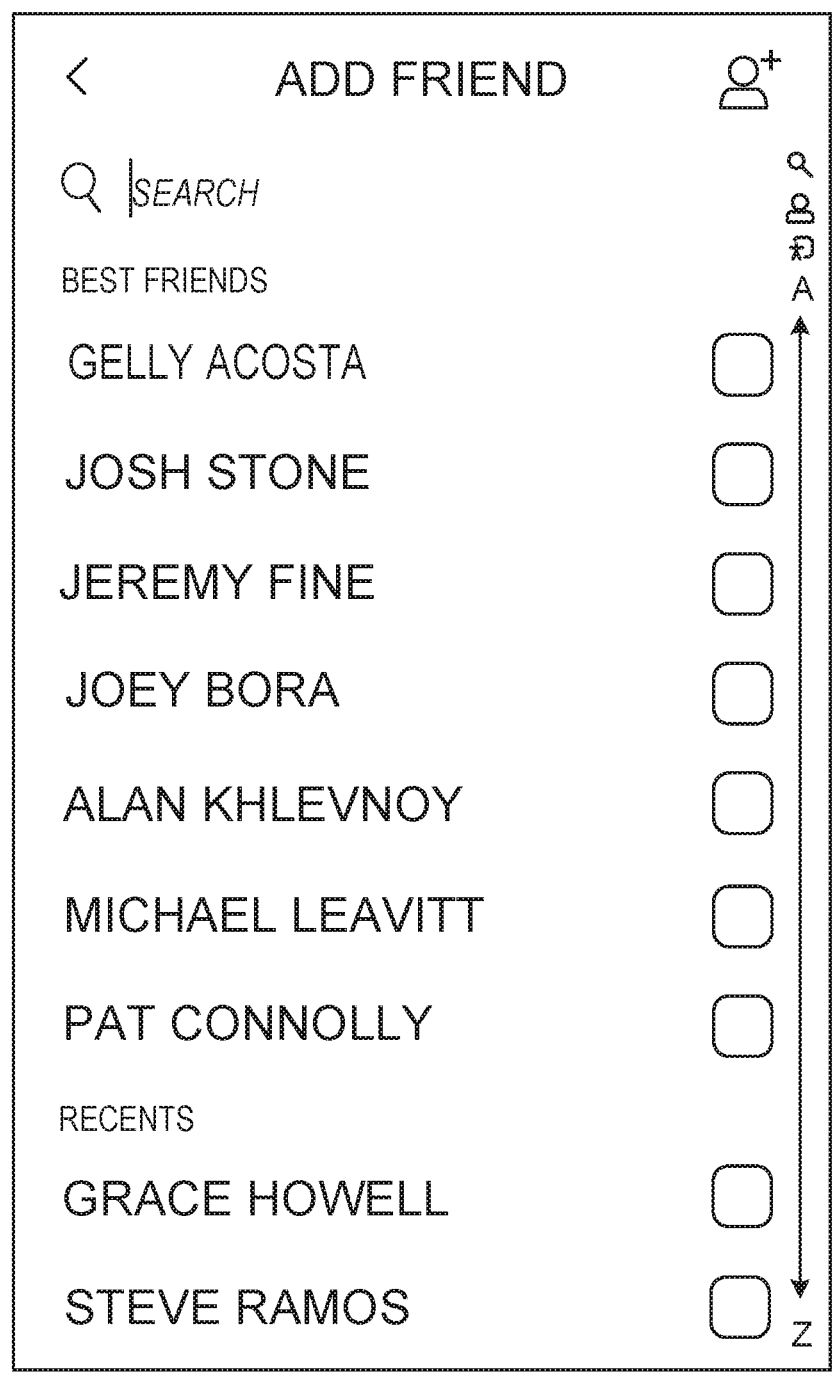
FIG. 4 illustrates aspects of ephemeral group chat, in accordance with certain example embodiments.

FIG. 4 illustrates additional aspects of ephemeral group chat, in accordance with certain example embodiments. FIG. 4 illustrates an example UI, shown as display 400, for adding a friend to a chat group. If a user selects the add friend interface 318 in the dropdown illustrated in FIG. 3, the user is taken to a list of my friends which has previously been established for the user. The user can tap on multiple names in the UI to add them to the group. This interaction is the same as the send to page for a single content message communication in various embodiments. After pressing "Done," the friends selected are added to the group. A user cannot add more friends to the group if the group is at its maximum size as defined by a system threshold.

In some embodiments, if a group reaches the maximum limit threshold while adding friends in the Add Friend page, the checkboxes disappear and the names dim to 50% opacity. If a user unchecks one of the friends that have been selected, the checkboxes reappear When a user joins a chat, for example by selecting an add friend interface 318, different embodiments may manage the availability of chat messages to the joining user in different ways. In some embodiments, chat messages that have not been deleted and that were sent to all previous group members are made available to the joining user, and associated deletion triggers are modified to add the joining user to any deletion criteria associated with all group members (e.g., deletion after all group members view the chat message for 10 seconds.) In some embodiments, however, the newly added member does not receive any previously sent chat messages. In such embodiments, the previously sent chat messages may maintain the same presentation within the chat flow of previous members, or the previous messages may be presented within a sub-chat interface such as the one described above (e.g. private group chat 242), with subsequent messages to the entire group presented in the main chat flow to all group members.

In certain embodiments, a system selects a user identifier for use in chat messages in different ways. In some embodiments, the system uses a first name of the user as identified from registration information. The first name is assumed to be the string that exists before the first space in a name field of account name data. In other embodiments, the first name may be derived or discovered in other ways. If there are multiple users in a group that have the same first name, the system will use the last name's (e.g., string that exists after the last space) initial, and will use additional characters until a unique identifier for the group is presented. In some embodiments, if there are conflicts with using the last initial, the system can use the whole last name, and a unique character or number may be generated by the system if additional conflicts remain.

If one name is Bob Smith and there is a Bob Jones in a group, Bob Smith will see Bob Jones as Bob and Bob Jones will see Bob Smith as Bob. Everyone else in the group will see Bob S. and Bob J.

In addition to the management of ephemeral messages, in some embodiments, a system interface may also indicate presence information, which provides group members information about which users are currently or have recently (e.g., within a threshold time period) accessed the group chat flow or messages from a group chat. This presence information is provided by a visual affordance to indicate who is present in the group with their first names in an unfilled bubble of their group chat color. These bubbles appear, starting on the left side above the chat input bar, and appear below and on the right side of the previous message as users enter the group.

As mentioned above, each user will have a distinct color assigned to them as they enter a group chat. These colors may be automatically assigned as part of a default system setting. In some embodiments, the colors may be adjusted based on user preferences or different selectable color templates.

In one embodiment, a color scheme may be implemented as follows:

A user's own color is red
The other colors are given out by order of joining the group
1—group chat red
2—light blue
3—light green
4—orange
5—pink
6—dark blue
7—dark green
8—purple If users were added at the same time, the tie-breaker is alphabetical order by display name. Color are not updated if people leave the group, but are maintained once assigned for the duration of a group's existence. When a user leaves, their color is assigned to a joining user in the order in which the user left. In other embodiments, colors may be assigned or reassigned in other ways.

An overall feed is a high-level organization of messages incoming at a client device. In one embodiment, each group chat has a cell in a feed. Selecting a cell within the flow will, in some embodiments, present a chat view such as chat view 202 for a particular group. In some embodiments of a flow, individual content messages and one-on-one chats may also have cells in the feed. In a group chat cell within a high-level flow, secondary text may be shown. In some embodiments, secondary text for group chats is shown within the flow if there are unread content communications or chats for a particular group. The secondary text shows the names of the people in the group who are contributing to the unread content. The names will be shown in order of when the content was sent, with the most recently sent shown last. Tapping or touching a cell in a UI may show a time stamp for messages.

If a group has not had any recent activity in a threshold amount of time (e.g., 1 month, 31 days, 60 days, etc.), then the group falls off the high-level feed. Groups with no saved content (e.g., groups for which all messages have met deletion criteria for deletion triggers associated with the messages communicated to the group) will be deleted from the system. If a group has saved content (e.g., content that has not met an associated deletion criteria), it will "fall off the feed," but be accessible by scrolling to the bottom of the feed and tapping a "show older conversations" UI space. Groups with saved content will also be accessible by search, along with any other searchable text messages such as one-on-one chats.

In some embodiments, search behavior acts as follows. A user can search for a group. If a user types "Bobby" into a search field, the user will see any one-on-one chats with users having the ID "Bobby" as well as any groups the user is in with other users with the ID "Bobby." Multiple users with last names or last initials may be shown if multiple exist (e.g. Bobby S., Bobby Jones, Bobby Johnson.)

A search matches the display name or the members (display name or username) in that group. If a group has fallen off the feed, a user can see it appear in search results by tapping the "show older conversations" UI interface. If a user searches by a group name that has since been changed, that group will still be surfaced in search results with the new name showing. If a group name has not been changed in the threshold time, the old group name will be removed from the system and will no longer be searchable.

A chat group may be generated in a number of different ways. In a high-level feed interface showing communication cells for existing groups, content messages, and one-on-one chats, a user can tap the "new chat" icon in the upper right corner of the feed. The user can select multiple people in the new chat view to be in a group. When a user has selected multiple user IDs to add to a group, the user can tap the header area of the UI to set the name of the group. The default group name will be the first names of the users, separated by commas. The group is only created after the originating user sends a text message or a content communication. If there is already a group with these members, the user will also see the existing group above the selected names FIGS. 5A-J illustrate aspects of ephemeral group chat including an example implementation of a send-to interface 500, according to one example embodiment. Send-to interface 500 includes a plurality of views, shown as views 502-512. Such a send-to interface 500 may be used to send a message to any number of other user accounts within a communication system. When a user has selected multiple other user accounts as recipients for the message within send-to interface 500, the user sees a create group interface 592 appear that allows the user to create a group of the selected other users, and makes a chat flow 594 available for the group. Views 502, 504, 506, 508, and 510 illustrate views of send-to interface 500 for selecting individuals for a group chat. View 510 shows a view with two users selected, one via a selection box, and one by a search input. In some embodiments, when a user selects a create group interface 592, the user is taken to chat flow 594 and the group is automatically created as shown by view 512. In some embodiments, when the user taps the create group interface 592, the user is taken to a confirmation page with the names selected, such as the confirmation page of view 518. On the confirmation page, the user can deselect names and name the group. The user can hit a confirmation button above the keyboard to commit the changes and generate the group if it does not exist. If there are existing group chat threads in which this same set of users exist, the user sees that group in the confirmation page directly above the selected group. If the user taps the preexisting group, the user is taken back to the send-to page with that group selected. In some embodiments, the new group is not created from this flow unless the user sends a content communication or text message to the new group.

Figure 5A:
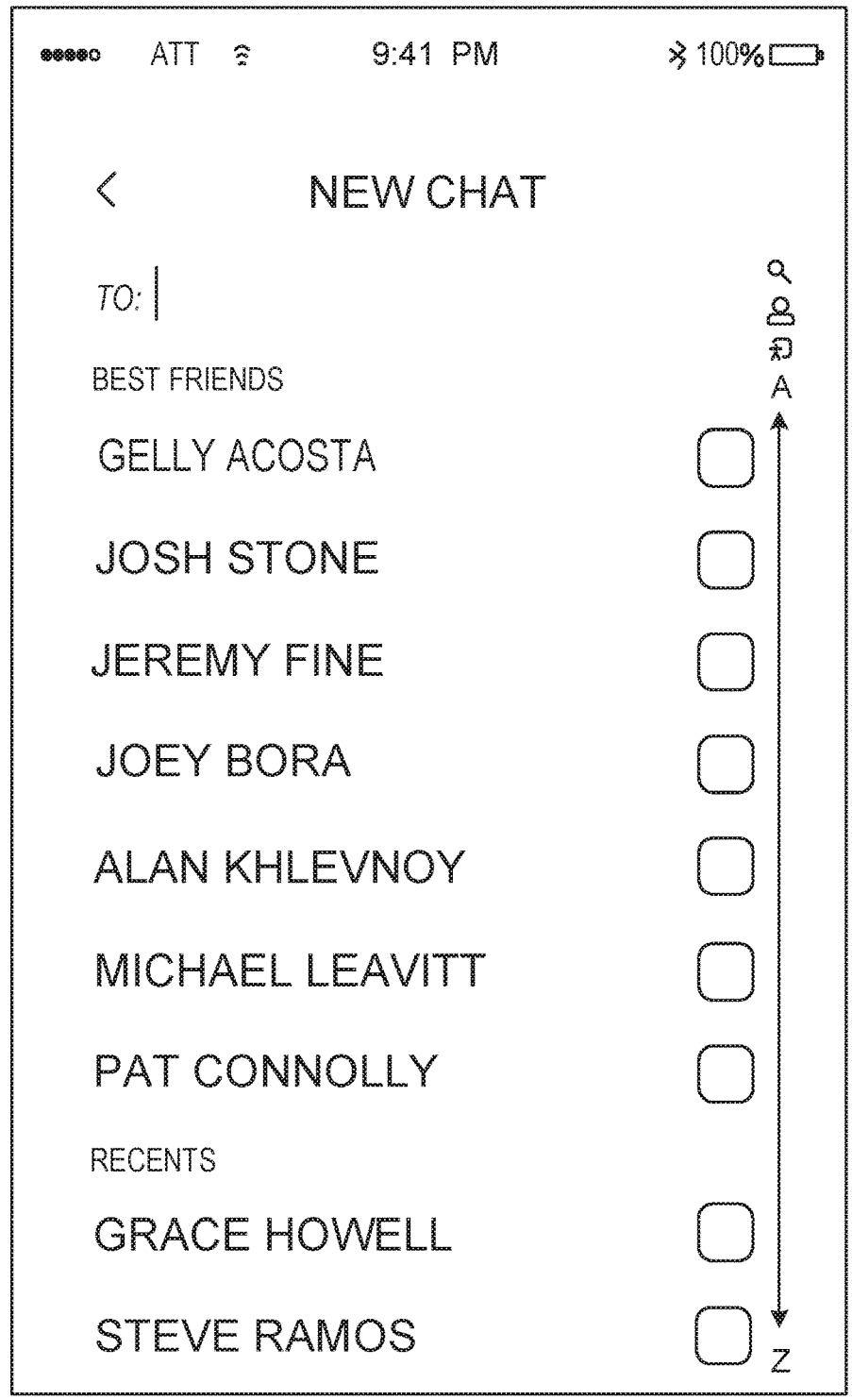
FIGS. 5A-J illustrate aspects of ephemeral group chat and an associated user interface, in accordance with certain example embodiments.
Figure 5B:
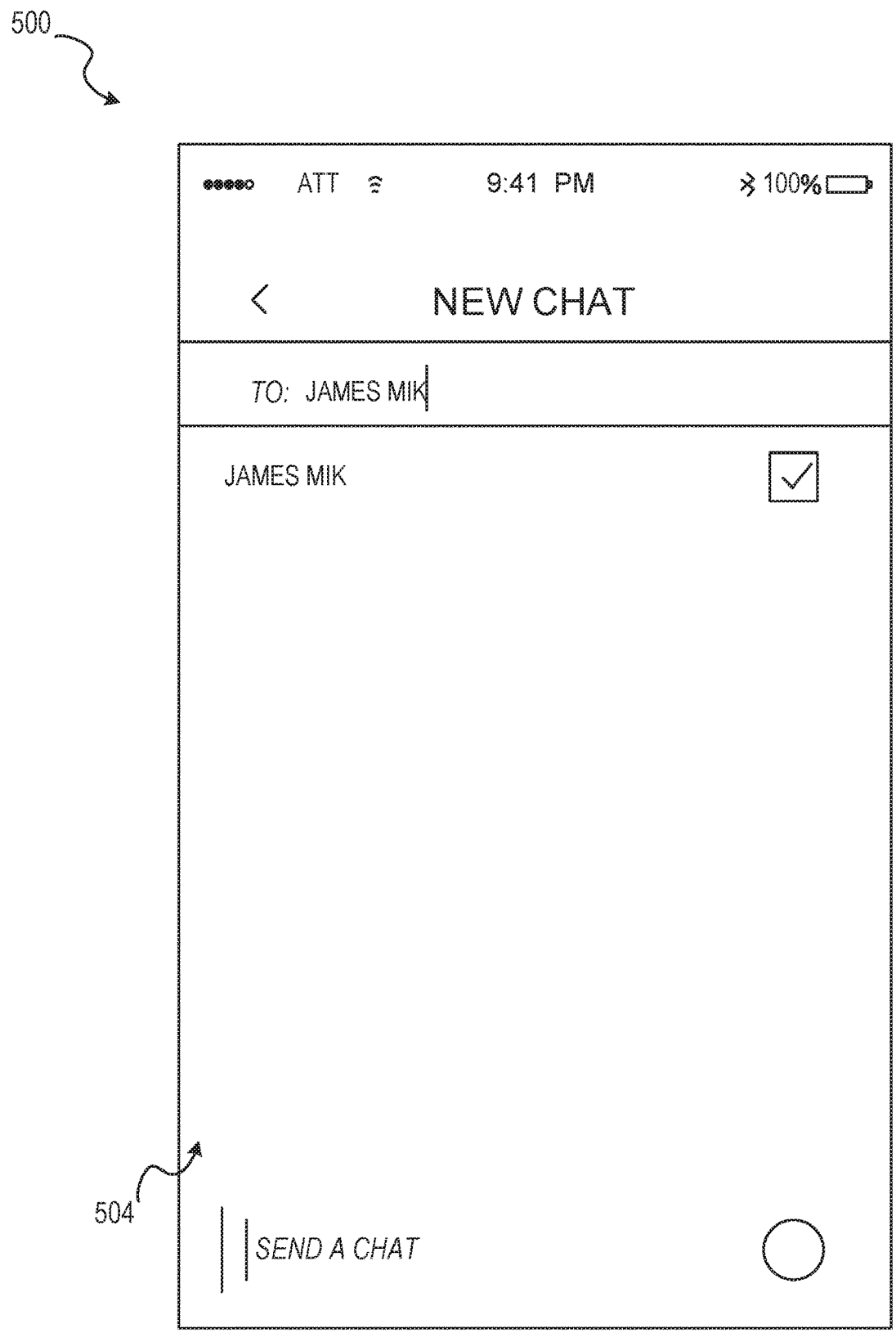
Figure 5C:
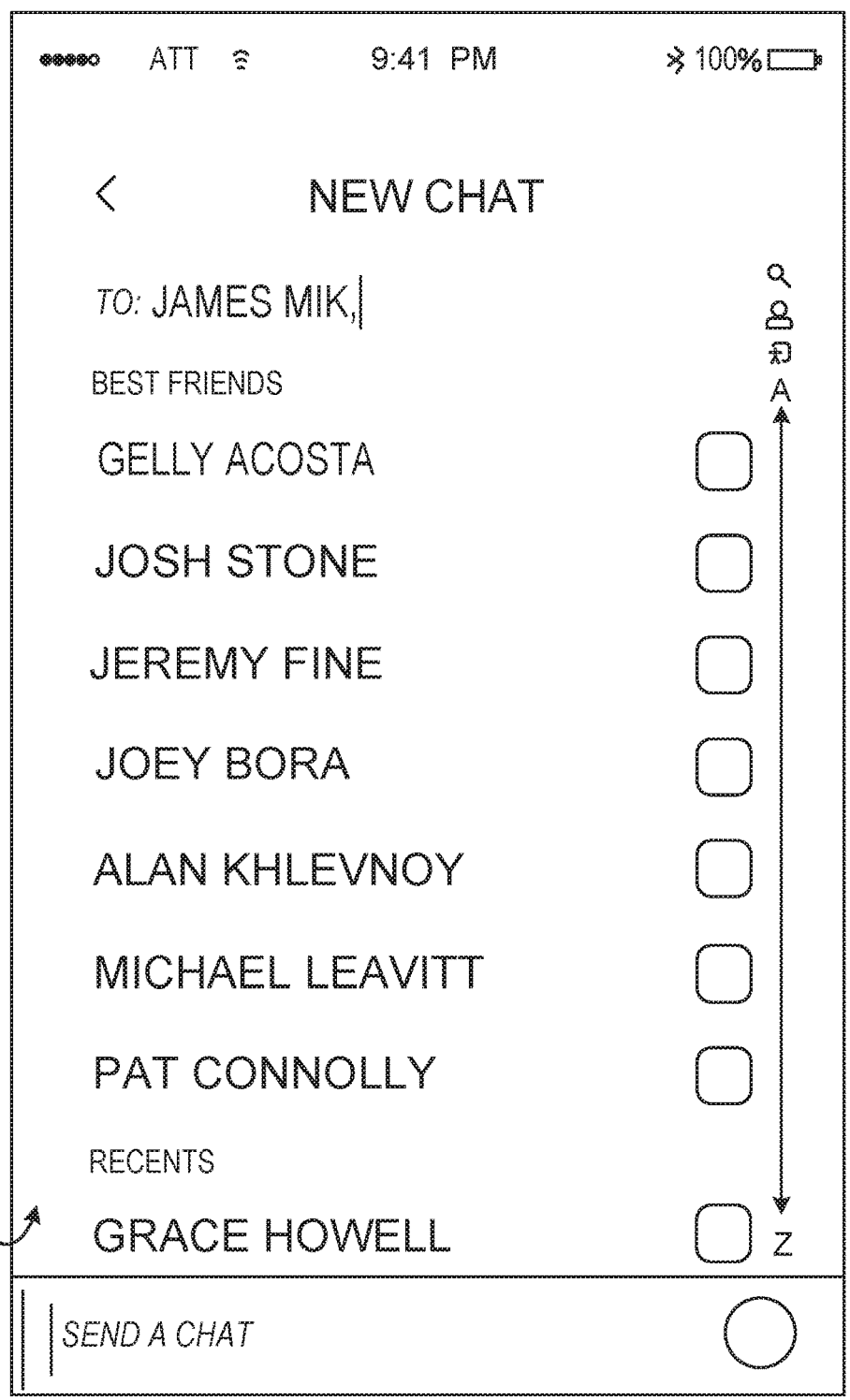
Figure 5D:
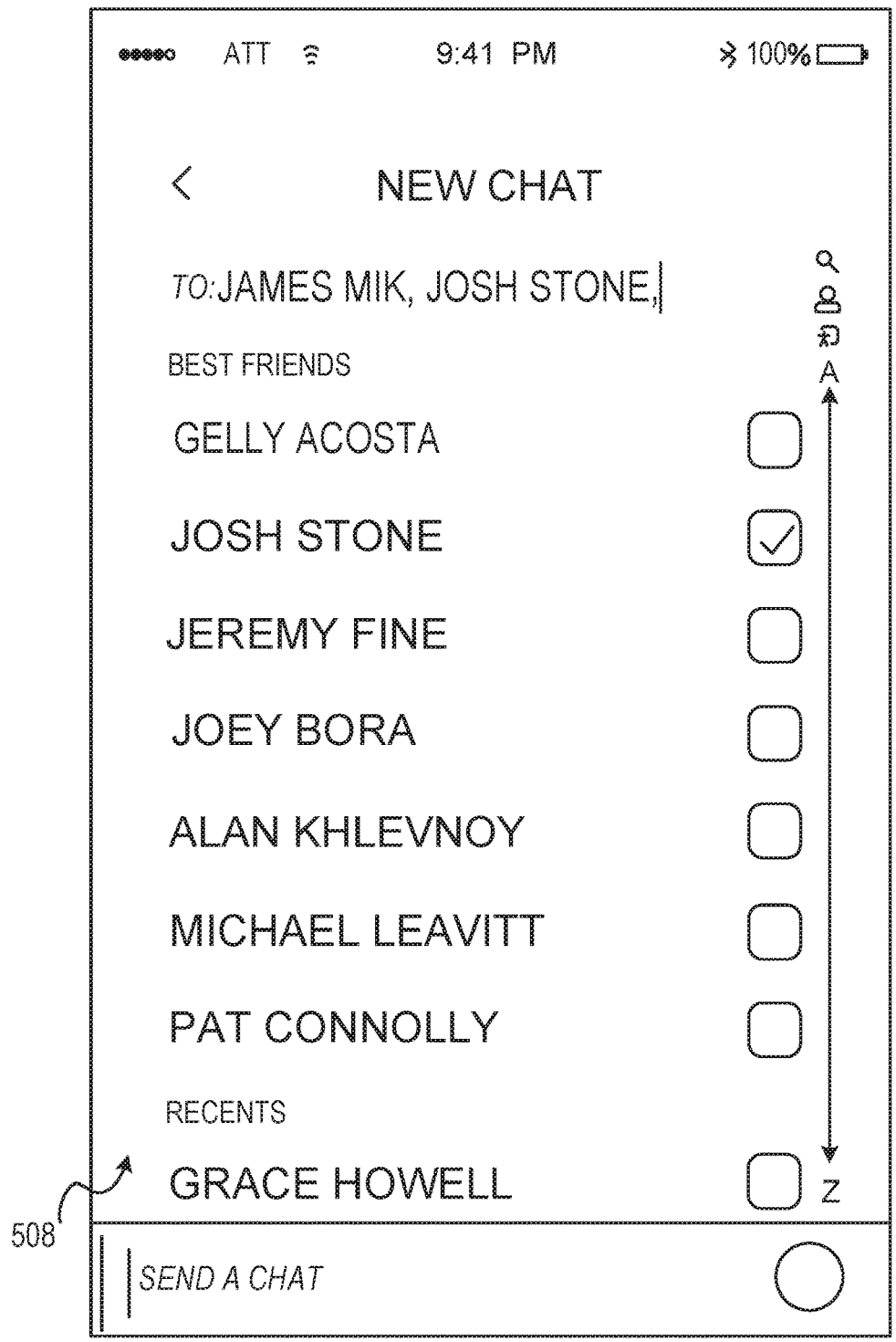
Figure 5E:
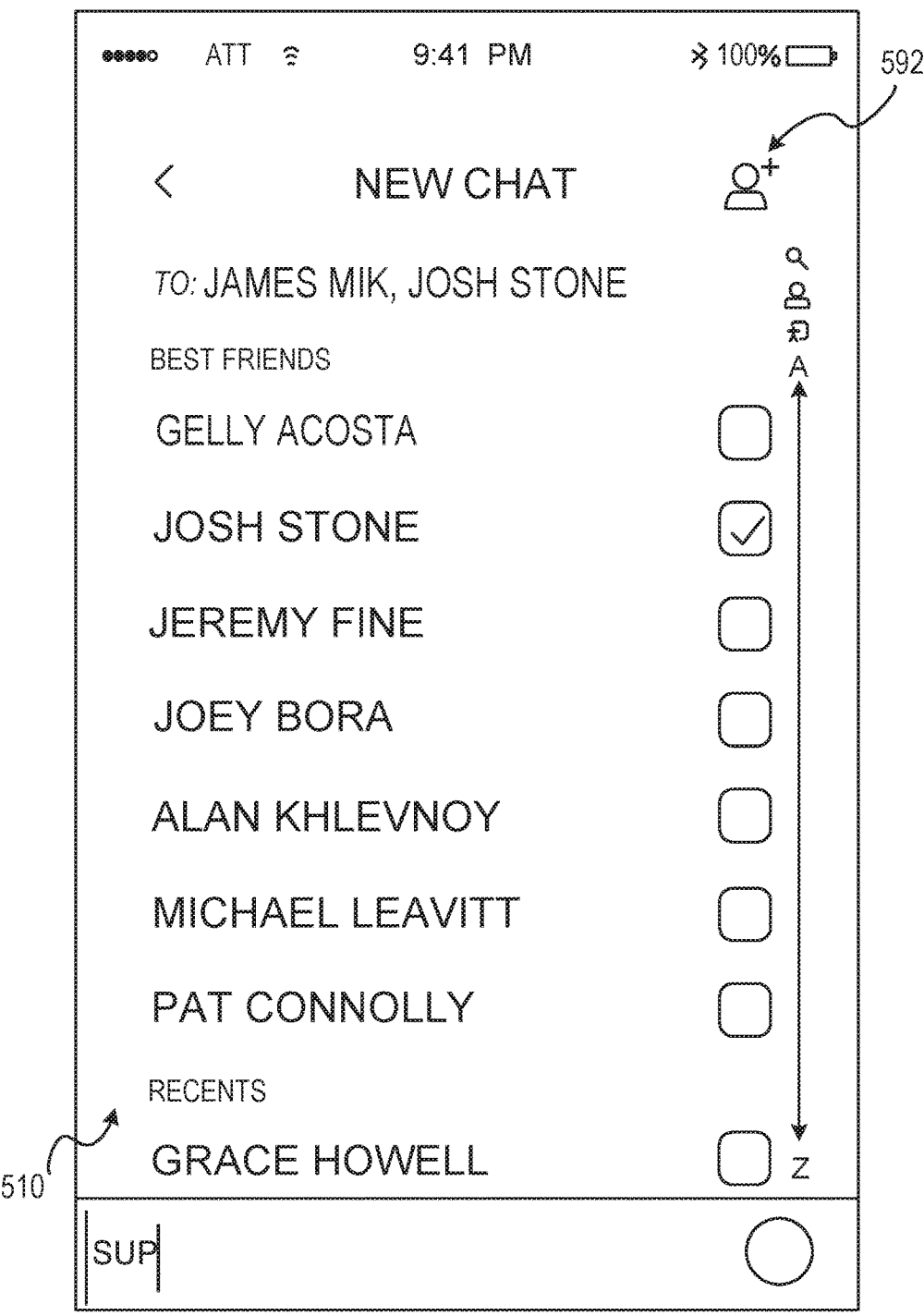
Figure 5F:
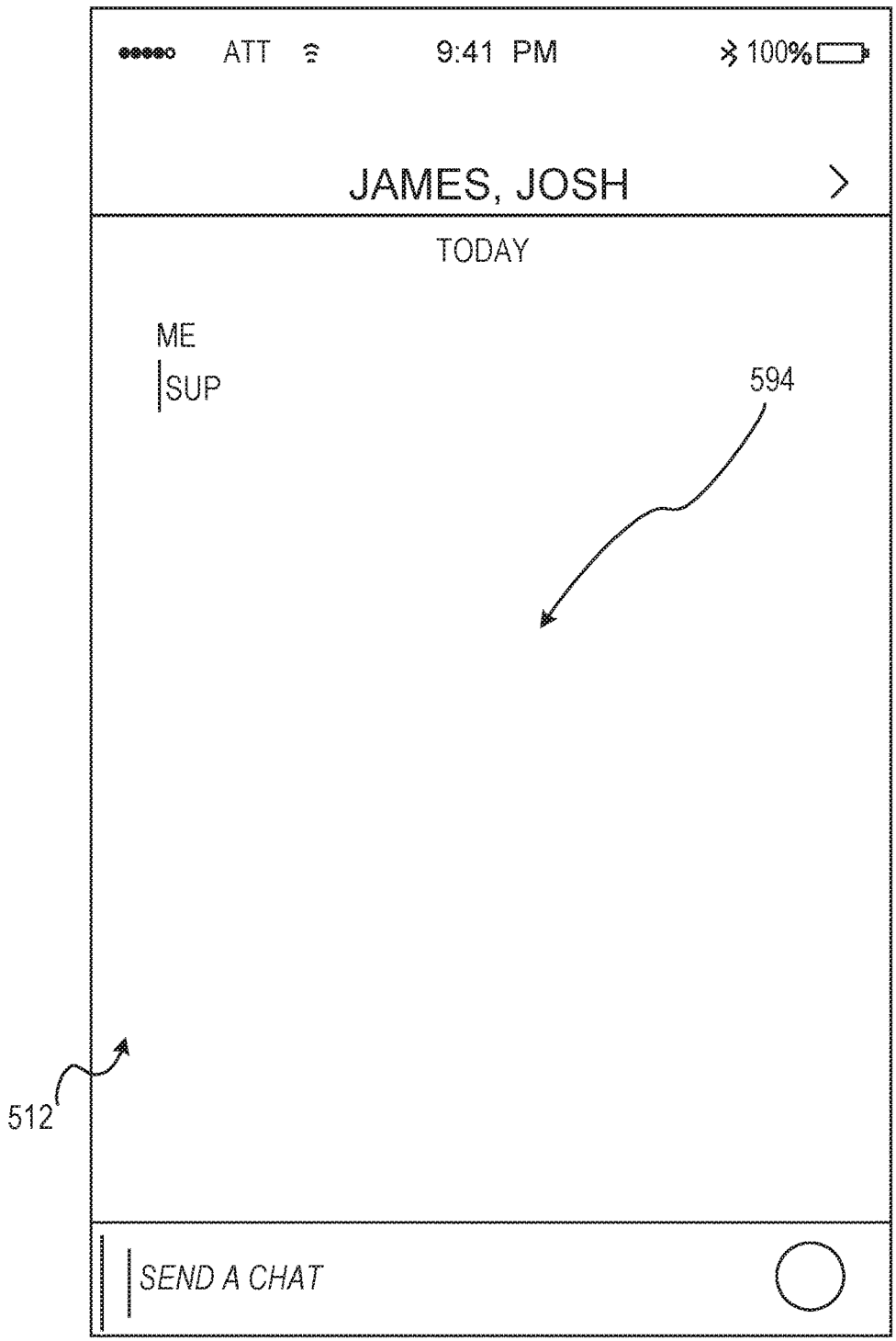
Figure 5G:
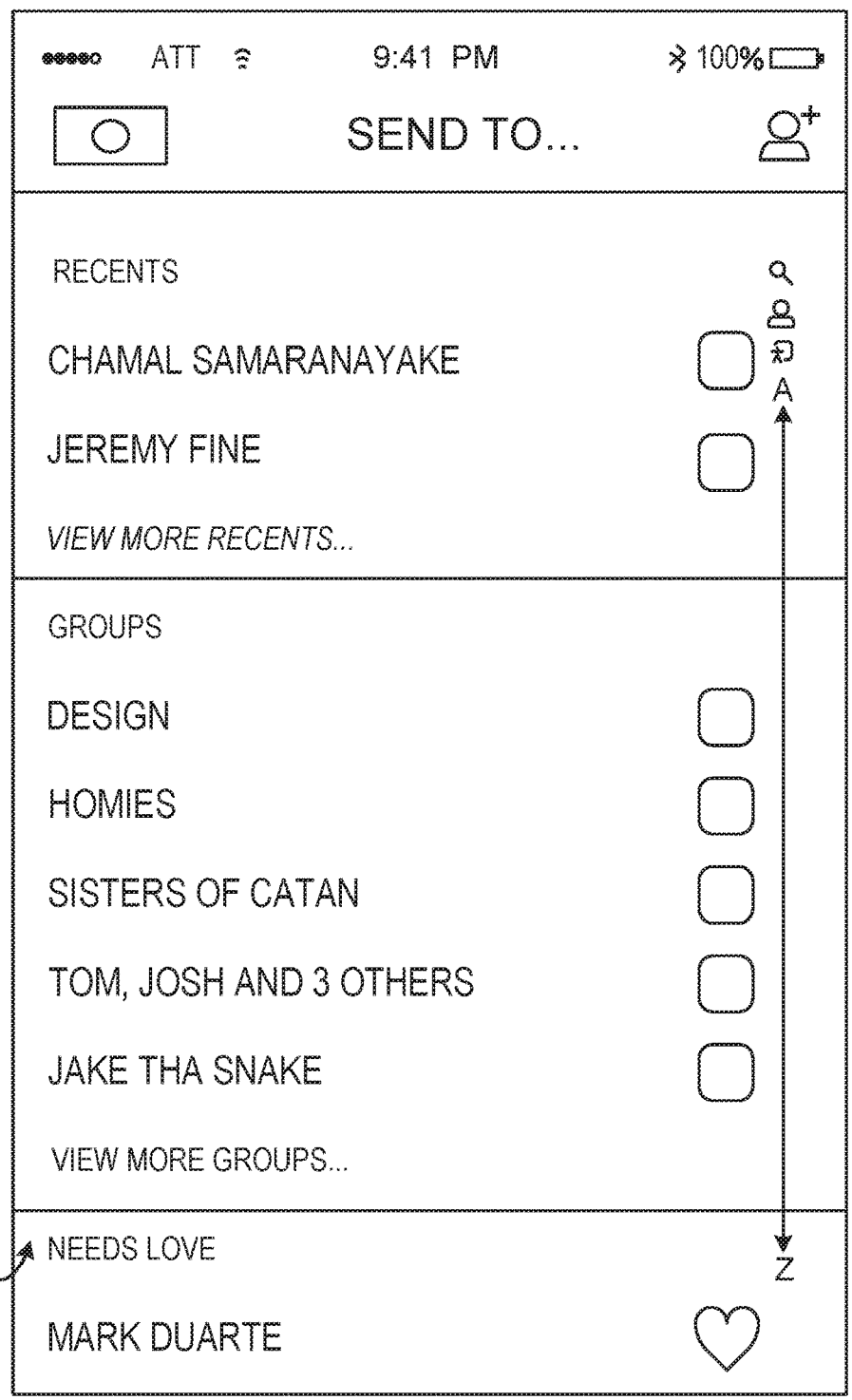
Figure 5H:
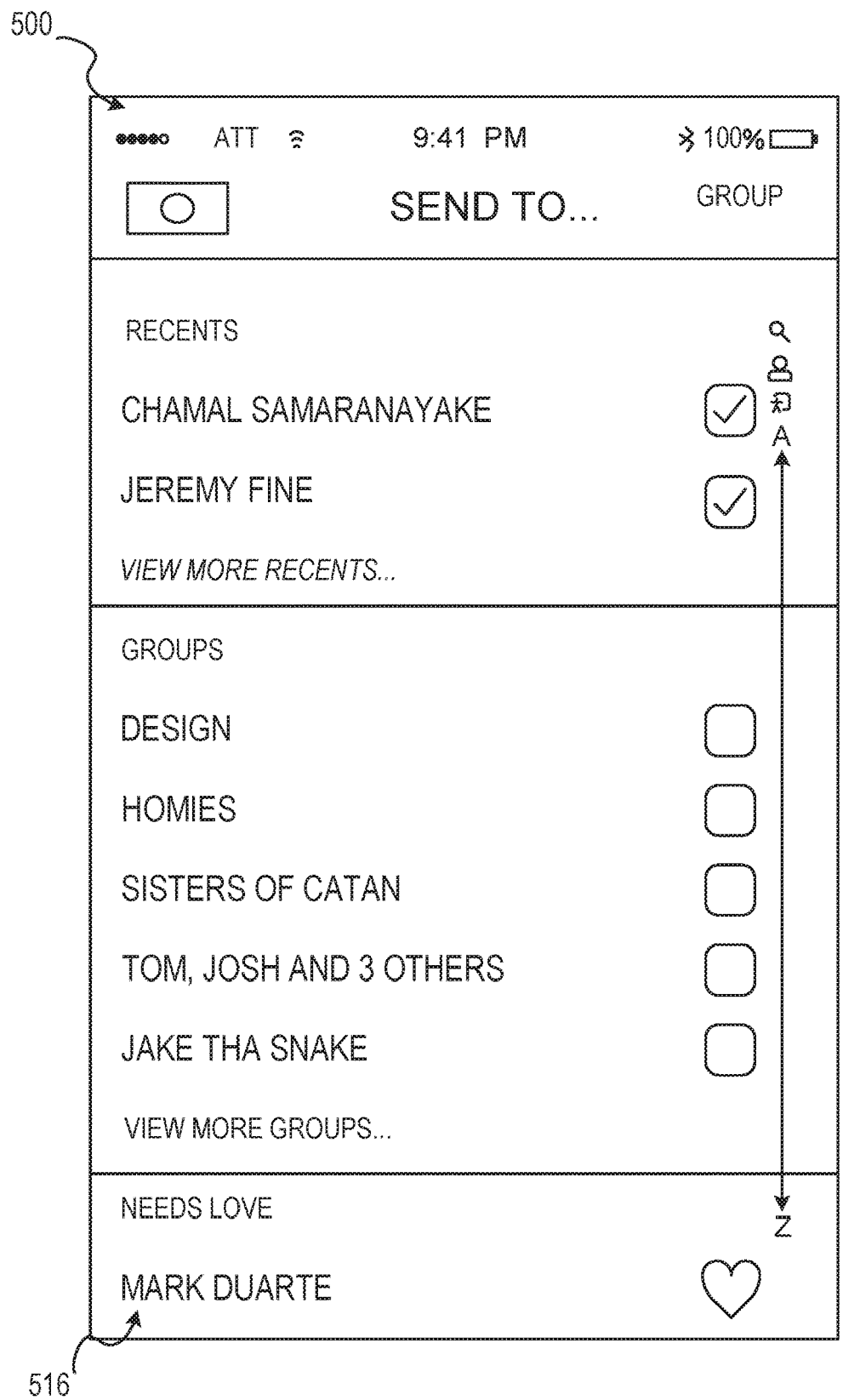
Figure 5I:
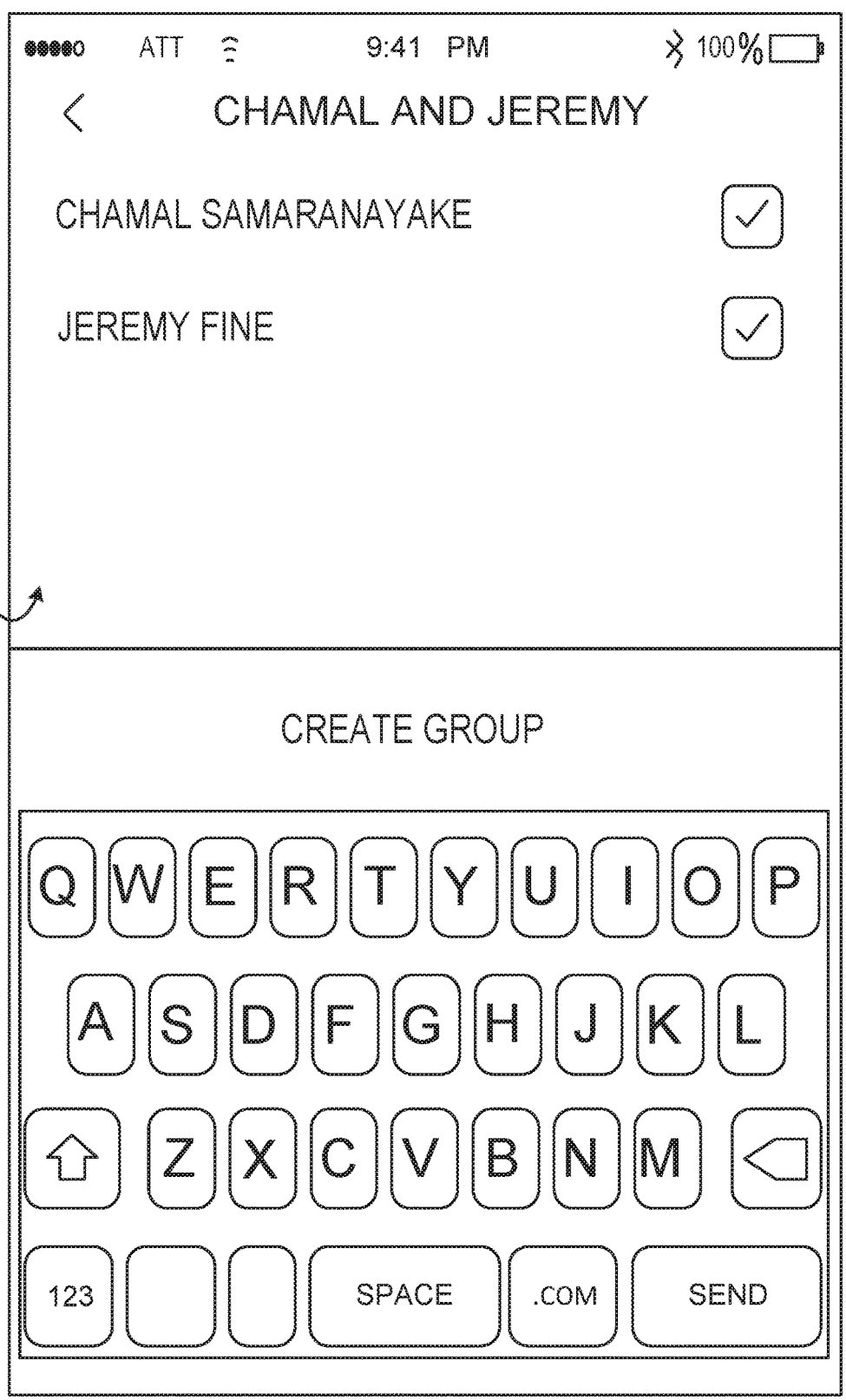
Figure 5J:
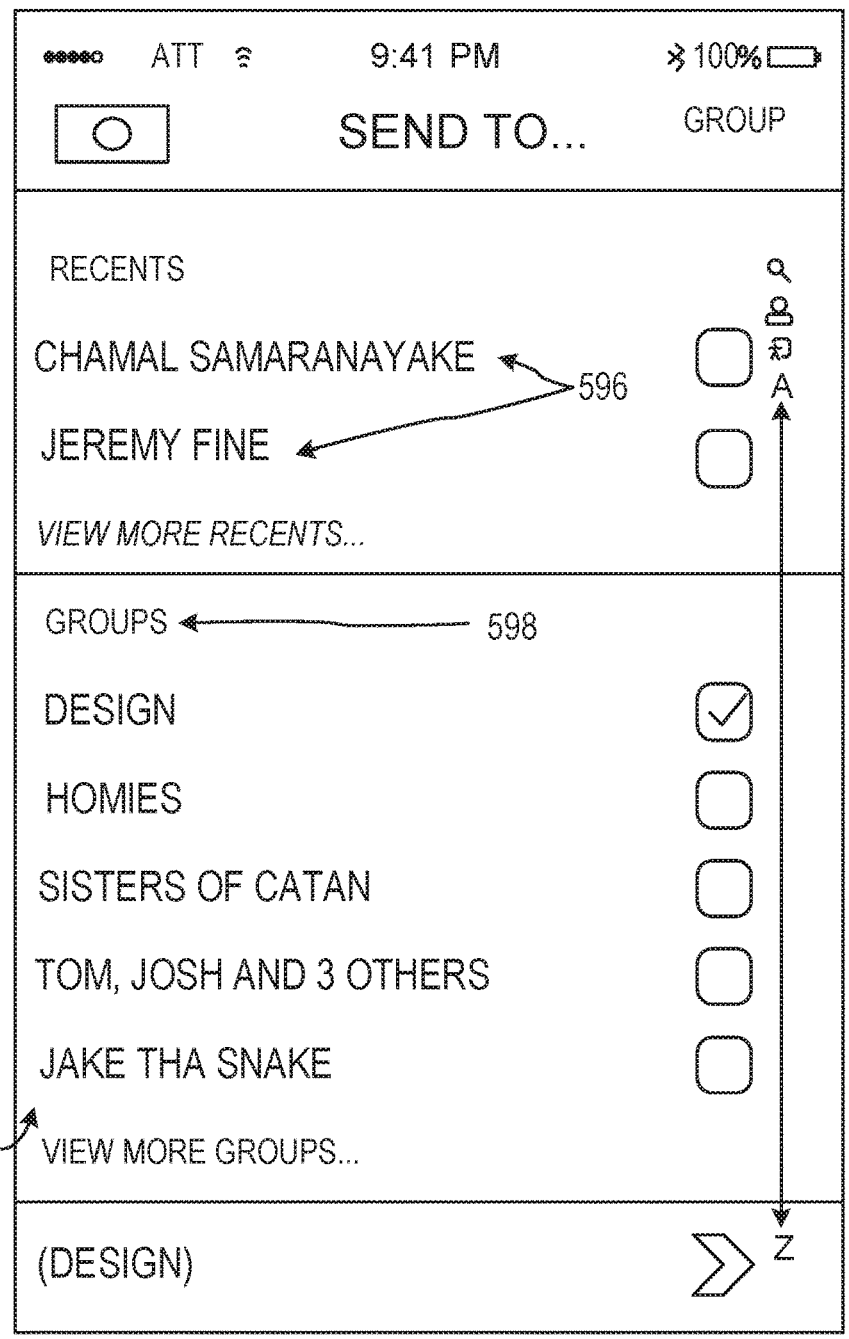

In some embodiments, as illustrated in FIG. 5J, the user can select other groups and users from the send-to interface 500 as well so that a single content communication may be sent to multiple groups. View 520 of FIG. 5J shows a list of groups 598 as well as user accounts 596. As part of send-to interface 500, a user may select multiple groups to send a message to. If different groups have different ephemeral triggers, the message may be deleted independent from different groups based on the particular deletion triggers and criteria for the particular group.

In some embodiments, if a user has created a group with users selected, the user is not prevented from selecting those users again to send the content communication to them individually or create another group with them. If a user has already created a group, accessing the send-to interface 500 and selecting two or more users again will cause the create group interface button to show up again. Tapping the create group button will create a new group for the users selected. If a user attempts to create a new group with the same users that the user just used to create a new group, an additional group is not created, but the user is directed to the previously created group.

In some embodiments, a user may additionally search for another user. If the user searches for names in the send-to page, groups containing those names will appear below the names of the matching users under a "Groups" header. Such embodiments may generate views with lists of individual users and groups, including any views such as views 520, 502-510, and 514-516.

Figure 6:
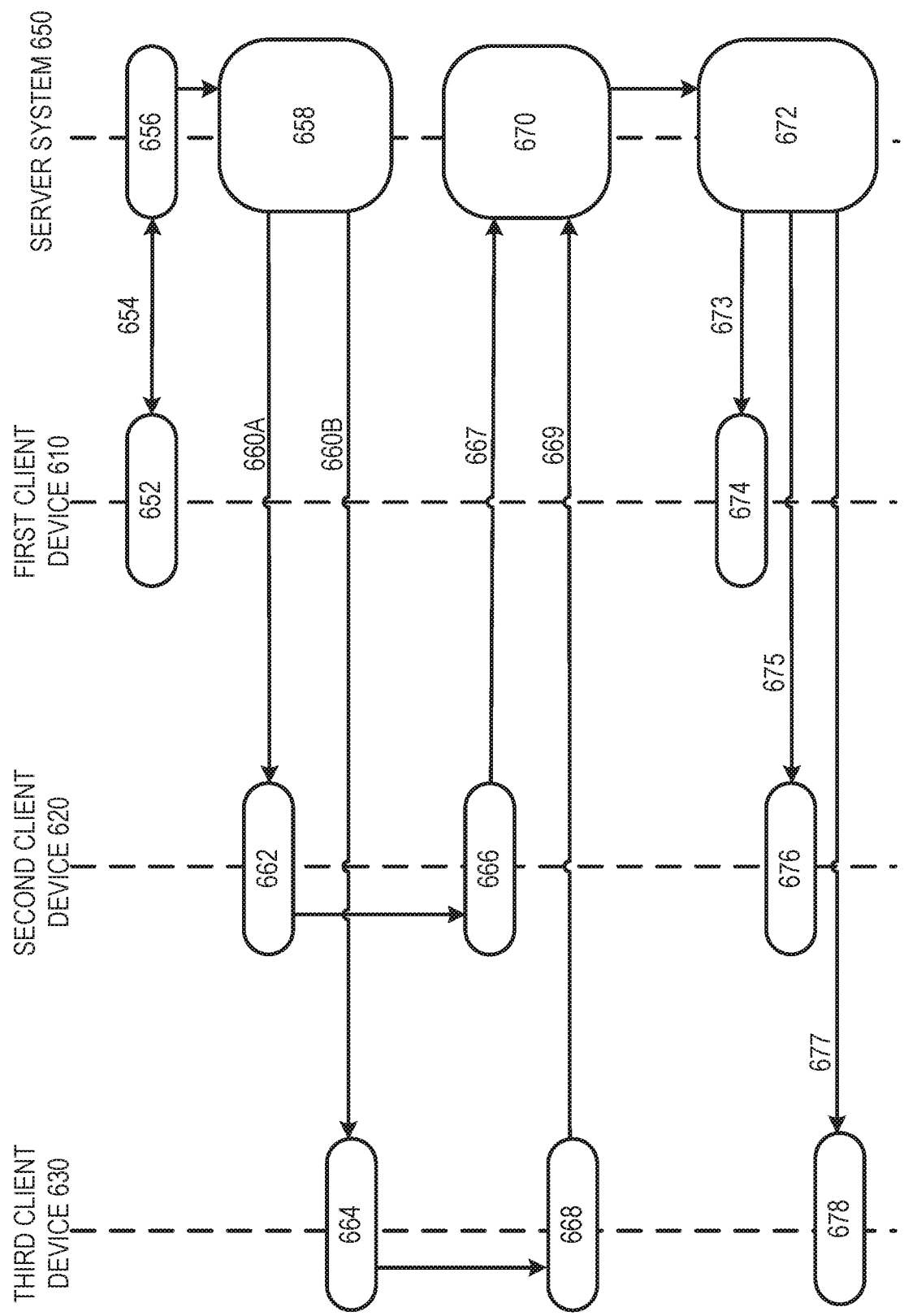
FIG. 6 illustrates communications between a server computer and client devices associated with user accounts that are part of an ephemeral group chat, in accordance with certain example embodiments.

FIG. 6 illustrates communications between a server computer and client devices associated with user accounts that are part of an ephemeral group chat, in accordance with certain example embodiments. FIG. 6 shows client devices 610, 620, and 630 communicating with each other via server system 650, and interacting with server system 650 to implement ephemeral group chat.

In the embodiment of FIG. 6, communications 654 between client device 610 and server system 650 enable generation of an association between at least three user accounts (e.g., a group) as part of an ephemeral group chat. First client device 610 may receive user inputs selecting the user accounts, or identifiers associated with the user accounts, in operation 652 and may communicate this list to server system 650. Sever system 650 processes the selection from first client device 610 and generates the association as an ephemeral group chat. In some embodiments, communications 654 include a first ephemeral chat message that is received at server system 650 before the association between accounts is stored at server system 650 in operation 656.

The first ephemeral chat message is associated with one or more deletion triggers. These deletion triggers may, in some embodiments be selected by preferences provided by first client device 610 in operation 652. In some embodiments, the deletion trigger is selected by a system operator as part of a fixed implementation of the communication system. In other embodiments, combinations of default deletion triggers and user selectable options for deletion triggers are used.

In some embodiments, a deletion trigger is based on each user account being associated with or tracking the display of the first ephemeral message for a threshold amount of time on a device associated with a corresponding account. In the embodiment of FIG. 6, this would involve the third client device 630 and the second client device 620 each independently verifying display of the first ephemeral message for a threshold amount of time to meet the deletion trigger. This is described below with respect to operations 666 and 668.

In other embodiments, a deletion trigger comprises display of the first ephemeral chat message for a threshold amount of time on any device corresponding to each user account. In still further embodiments, a deletion trigger comprises a threshold time since transmission of the first ephemeral message from the server system 650. In still further embodiments, a deletion trigger comprises receipt of deletion messages from a threshold number of devices associated with the at least three user accounts, wherein the deletion messages are received in response to message delete inputs received at corresponding user interfaces of devices associated with the at least three user accounts. In still further embodiments, a deletion trigger comprises receipt by the server system of chat monitoring information indicating that at least a portion of the client devices associated with the group chat have viewed the chat message for a threshold amount of time, and that a threshold time since the message was sent has also passed. In further embodiments, additional deletion triggers or combinations of deletion triggers described herein may be used. In some embodiments, a deletion trigger may be dependent upon a subsequent chat message, such that a message that receives a response within a certain time may have a trigger modified, or may be associated with a different trigger than a message that does not receive a response within a threshold time.

After the association between accounts occurs, and a first ephemeral message is received at server system 650, then in operation 658, the server system manages communication of the first ephemeral chat message to client devices 620 and 630 in ephemeral chat communications 660A and 660B, which include copies of the first ephemeral chat message. Second client device 620 and third client device 630 are identified by their association with corresponding user accounts that where identified by communication 654 and operations 652 and/or 656.

After second client device 620 processes the first ephemeral message in operation 662, then the second client device 620 monitors activity associated with the group chat and the first ephemeral message in operation 666, and sends chat monitoring information in communications 667, which may be a single communication or repeated communications over time. At least a portion of this information comprises information associated with the deletion trigger.

Similarly, third client device 630 processes the first ephemeral message in operation 664, then activity associated with the group chat and the first ephemeral message in operation 668, and may send chat monitoring information in communications 669, which may be a single communication or repeated communications over time. In some embodiments, where information from all user accounts is not needed for a deletion trigger, only one device may send deletion trigger information to the server system 650.

In operation 670, server system 650 (e.g., a networked server computer system) processes the chat monitoring information received from devices associated with user accounts from the group chat (e.g., accounts and devices associated by operation 656.) This process may monitor any number of chat monitoring communications from devices, until deletion trigger information is received that is used to identify that deletion criteria or a deletion trigger status has been met for the first ephemeral chat message. When the deletion trigger information identifies that the deletion trigger has been activated, then in operation 672, the server system 650 initiates communications to devices in the chat group implementing the deletion. For second client device 620 and third client device 630, communications 675 and 677 are commands to delete the data associated with the first ephemeral chat message, including any associated content, in operation 676 and 678. For first client device 610 that sent the first ephemeral chat message, communication 673 may be a command to delete the first ephemeral chat message, or may be a status communication indicating that the deletion trigger has been met or that deletion has been successfully reported from some or all devices associated with the ephemeral group chat. Operation 674 receives and takes any appropriate action at first client device 610 in response to communication 673.

Thus, as described herein, some embodiments relate to technical problems of data privacy, security, and data clean up. Some embodiments may be considered solutions to a technical problem associated with a right for data to be removed or forgotten from networking systems or social networks. Limited technical solutions including particular deletion triggers and communication signaling to synchronize deletion of data and to notify and confirm to sending and/or receiving devices when data is removed from the system are also contemplated as technical solutions to the above problems in various embodiments.

In various embodiments, any number of client devices that are part of a group chat association may send and receive ephemeral chat messages, such that operations such as that described in FIG. 6 may be occurring simultaneously for chat messages sent by multiple devices and received by the other devices. For example, second client device 620 may send two messages to the entire group, and one message as a private whisper message within the group flow to the first client device 610. Third client device 630 may send a message to all group members. First client device may respond to the private whisper message from the second client device. Each of these messages may be associated with separate deletion triggers and deleting timing from the deletion triggers, with the timing based at least in part of timestamps associated with the messages.

Figure 7:
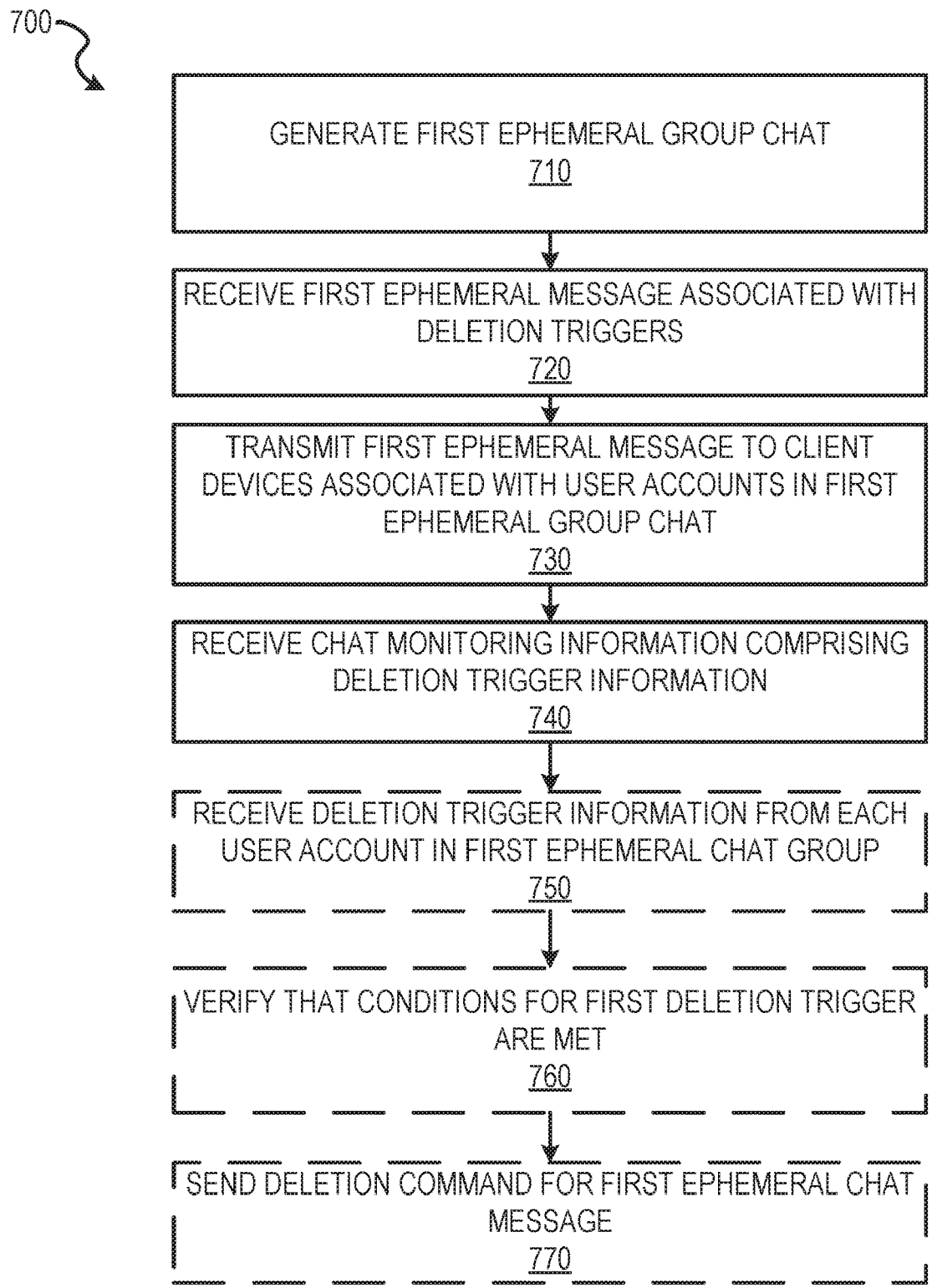
FIG. 7 illustrates a method for implementing ephemeral group chat, in accordance with some example embodiments.

FIG. 7 illustrates a method for implementing ephemeral group chat, in accordance with some example embodiments. Method 700 is performed by a server computer or server system, such as any server computer or server system described herein including server system 150 or server system 650, which may be implemented using any machine described herein. In some embodiments, method 700 is implemented as instructions on a computer readable medium that, when executed by one or more processors of a machine, cause the machine to perform method 700.

Method 700 begins with operation 710 involving generating, at a server computer of a social network communication system, an association between at least three user accounts as part of a first ephemeral group chat. This may include communications with one or more client devices, such as communication 654 of FIG. 6. In related embodiments, corresponding operations at a client device may operate to provide a list of user accounts.

Operation 720 then involves receiving, from a first client device associated with a first user account of the at least three user accounts, a first ephemeral chat message associated with one or more deletion triggers. In various embodiments, this may be the same device or a different device than the device that provides information to generate the group chat associations.

The server computer then transmits the first ephemeral message, as part of operation 730, to a second client device associated with a second user account of the at least three user accounts and to a third client device associated with a third user account of the at least three user accounts.

After the ephemeral message is sent, the server computer begins receiving chat monitoring information comprising first deletion trigger information in operation 740. The chat monitoring information may include status and presence information which is used to generate communications to devices associated with the ephemeral group chat. At some point in the monitoring of the chat monitoring information from the client devices performed at the server computer, the server receives deletion trigger information. In the optional embodiment of operation 750, the server computer receives deletion trigger information from each user account. In some embodiments, this includes information from multiple devices associated with a single account. This occurs when a first device for an account accesses the ephemeral message, and then the ephemeral message is also accessed on a second account. For deletion triggers based on viewing time, non-simultaneous display at multiple devices associated with a single account is used to determine whether a deletion trigger is met. In other embodiments, each device's monitor displays time separately, and the portion of the deletion trigger for that account is only met when one device meets the deletion threshold.

In operation 760, the server computer verifies that all portions of a deletion trigger (e.g., for a deletion trigger with criteria to be met by multiple devices from different user accounts) are met. Following this verification, the server computer sends a deletion command in operation 770 for the associated ephemeral chat message, or otherwise manages interactions with client devices to verify that the ephemeral message is deleted as expected. In some embodiments, this further includes tracking screen capture of content from the ephemeral chat message and communicating to the sending user account or all user accounts that a non-ephemeral copy of content was generated.

Method 700 describes one particular method for implementing ephemeral group chat. It will be understood that additional embodiments are possible using similar operations with intervening steps or operations ordered in different ways. Similarly, corresponding operations performed by client devices are described throughout, and various embodiments performed by client devices complementing methods performed by a server computer such as method 700 are considered as embodiments.

Figure 8:
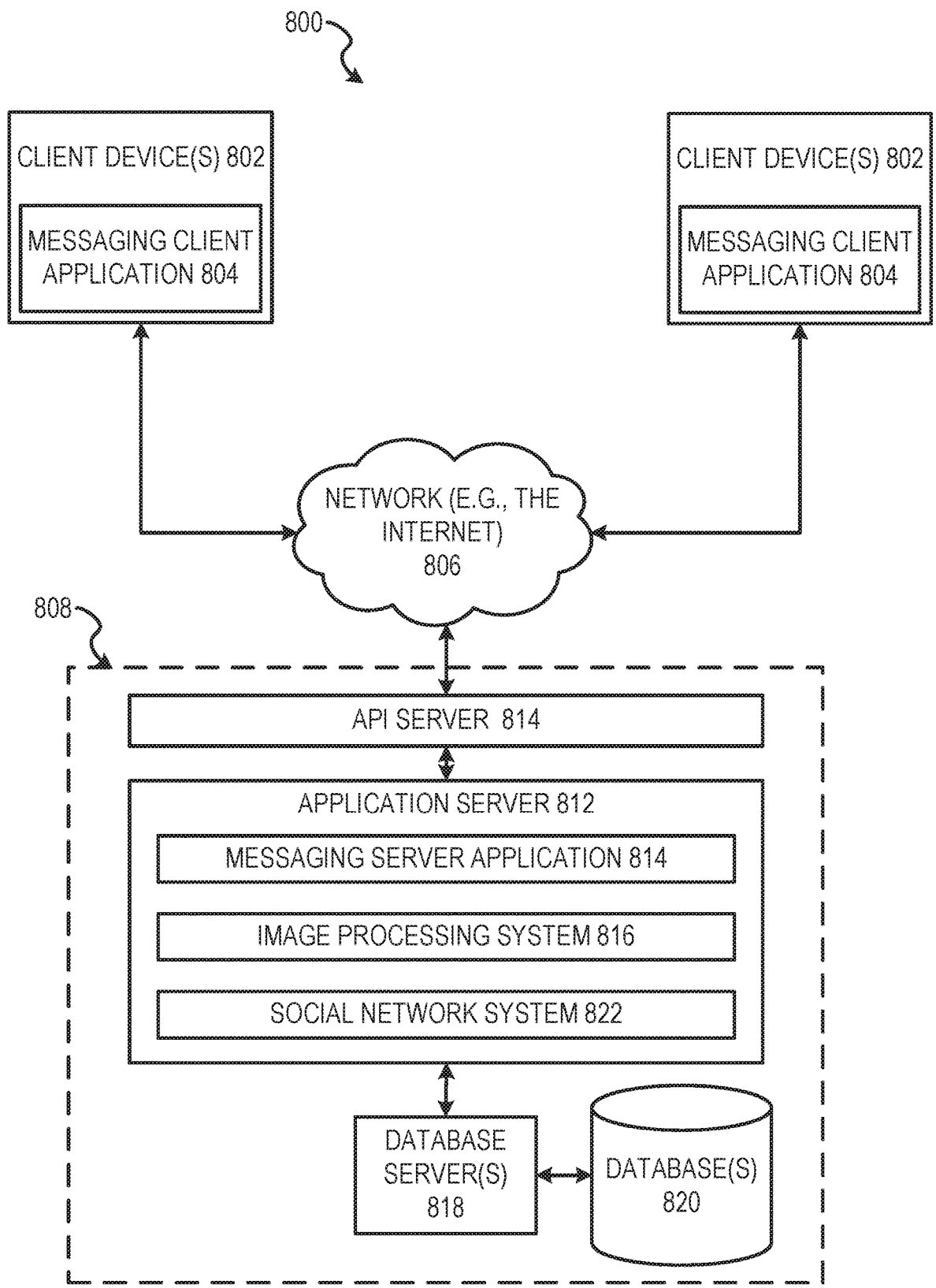
FIG. 8 illustrates aspects of a communication system which implements ephemeral group chat, in accordance with some embodiments.

FIG. 8 illustrates aspects of a communication system which implements ephemeral group chat, in accordance with some embodiments. FIG. 8 is a block diagram showing an example messaging system 800 for exchanging data (e.g., messages and associated content) over a network. The messaging system 800 includes multiple client devices 802, each of which hosts a number of applications including a messaging client application 804. Each messaging client application 804 is communicatively coupled to other instances of the messaging client application 804 and a messaging server system 808 via a network 806 (e.g., the Internet).

Accordingly, each messaging client application 804 is able to communicate and exchange data with another messaging client application 804 and with the messaging server system 808 via the network 806. The data exchanged between messaging client applications 804, and between a messaging client application 804 and the messaging server system 808, includes functions (e.g., commands to invoke functions) as well as payload data (e.g., text, audio, video or other multimedia data).

The messaging server system 808 provides server-side functionality via the network 806 to a particular messaging client application 804. While certain functions of the messaging system 800 are described herein as being performed by either a messaging client application 804 or by the messaging server system 808, it will be appreciated that the location of certain functionality either within the messaging client application 804 or the messaging server system 808 is a design choice. For example, it may be technically preferable to initially deploy certain technology and functionality within the messaging server system 808, but to later migrate this technology and functionality to the messaging client application 804 where a client device 802 has a sufficient processing capacity.

The messaging server system 808 supports various services and operations that are provided to the messaging client application 804. Such operations include transmitting data to, receiving data from, and processing data generated by the messaging client application 804. This data may include message content, client device information, geolocation information, media annotation and overlays, message content persistence conditions, social network information, and live event information, as examples. Data exchanges within the messaging system 800 are invoked and controlled through functions available via UIs of the messaging client application 804.

Turning now specifically to the messaging server system 808, an Application Program Interface (API) server 810 is coupled to, and provides a programmatic interface to, an application server 812. The application server 812 is communicatively coupled to a database server 818, which facilitates access to a database 820 in which is stored data associated with messages processed by the application server 812.

Dealing specifically with the API server 810, this server receives and transmits message data (e.g., commands and message payloads) between the client device 802 and the application server 812. Specifically, the API server 810 provides a set of interfaces (e.g., routines and protocols) that can be called or queried by the messaging client application 804 in order to invoke functionality of the application server 812. The API server 810 exposes various functions supported by the application server 812, including account registration, login functionality, the sending of messages, via the application server 812, from a particular messaging client application 804 to another messaging client application 804' the sending of media files (e.g., images or video) from a messaging client application 804 to a messaging server application 814; and, for possible access by another messaging client application 804, the setting of a collection of media data (e.g., story), the retrieval of a list of friends of a user of a client device 802, the retrieval of such collections, the retrieval of messages and content, the adding and deletion of friends to a social graph, the location of friends within a social graph, and opening an application event (e.g., relating to the messaging client application 804).

The application server 812 hosts a number of applications and subsystems, including a messaging server application 814, an image processing system 816 and a social network system 822. The messaging server application 814 implements a number of message processing technologies and functions, particularly related to the aggregation and other processing of content (e.g., textual and multimedia content) included in messages received from multiple instances of the messaging client application 804. As will be described in further detail, the text and media content from multiple sources may be aggregated into collections of content (e.g., called stories or galleries). These collections are then made available, by the messaging server application 814, to the messaging client application 804. Other processor and memory intensive processing of data may also be performed server-side by the messaging server application 814, in view of the hardware requirements for such processing.

The application server 812 also includes an image processing system 816 that is dedicated to performing various image processing operations, typically with respect to images or video received within the payload of a message at the messaging server application 814.

The social network system 822 supports various social networking functions and services, and makes these functions and services available to the messaging server application 814. To this end, the social network system 822 maintains and accesses an entity graph 304 within the database 820. Examples of functions and services supported by the social network system 822 include the identification of other users of the messaging system 800 with which a particular user has relationships or is "following," and also the identification of other entities and interests of a particular user.

The application server 812 is communicatively coupled to a database server 818, which facilitates access to a database 820 in which is stored data associated with messages processed by the messaging server application 814.

Figure 9:
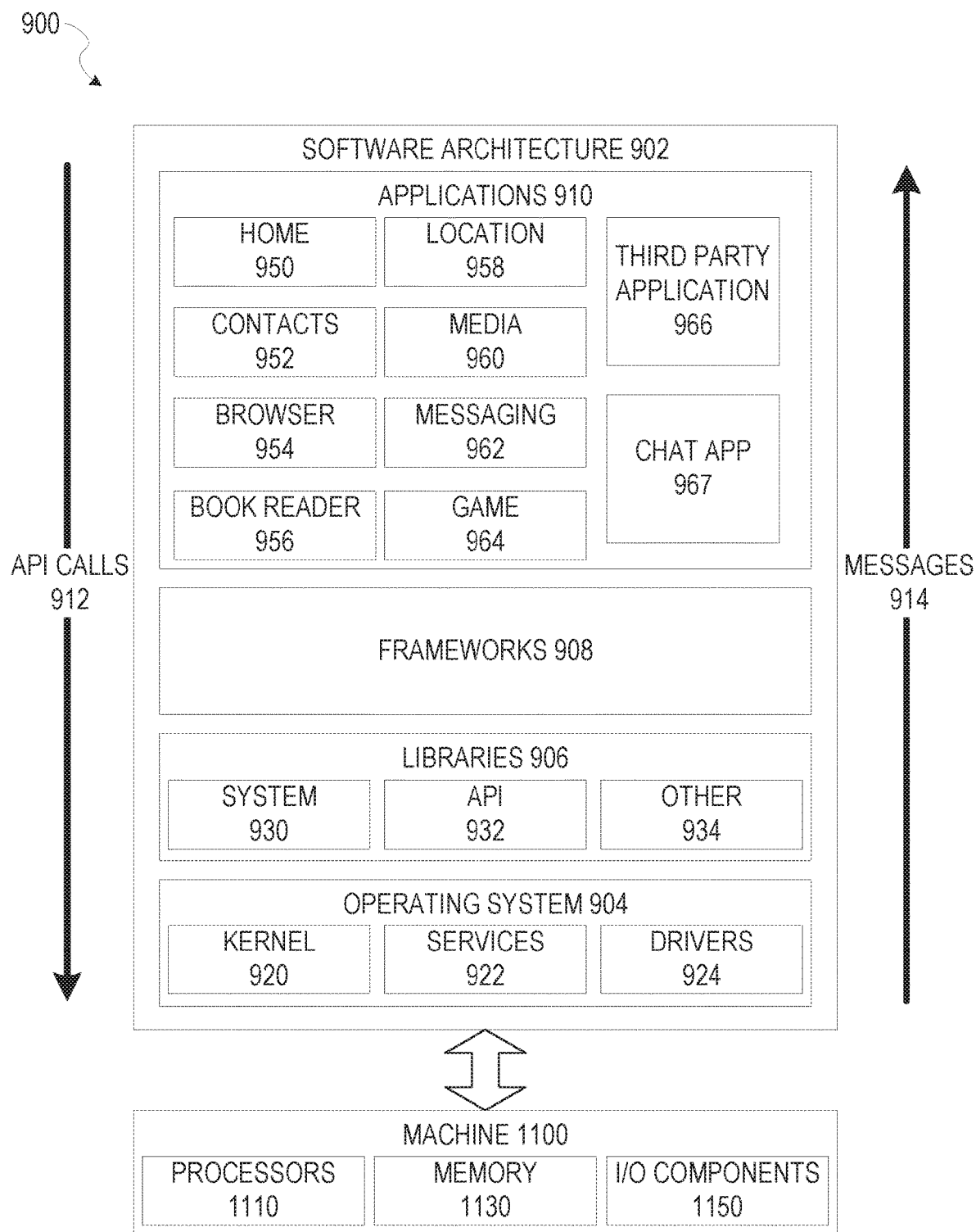
FIG. 9 is a block diagram illustrating an example of a software architecture that may be installed on a machine, according to some example embodiments.

FIG. 9 is a block diagram 900 illustrating architecture of software 902, which can be installed on any one or more of the devices described above. For example, in various embodiments, client devices 110, 120, 130 and server systems 150 may be implemented using some or all of the elements of software 902 to enable ephemeral group chat and associated content communications. FIG. 9 is merely a non-limiting example of a software architecture, and it will be appreciated that many other architectures can be implemented to facilitate the functionality described herein. In various embodiments, the software 902 is implemented by hardware such as machine 1100 of FIG. 11 that includes processors 1110, memory 1130, and input/output (I/O) components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 966 can invoke the API calls 912 provided by the operating system 904 to facilitate functionality described herein.

Some embodiments may particularly include a chat application 967. In certain embodiments, this may be a stand-alone application that operates to manage communications with a server system such as server system 150. A chat application 967 may include implementations for multiple user interfaces, including a top level flow interface that presents cells for different group chats and content communications, as well as system settings, individual group chat message flows, or any other interface material, such as the example interfaces presented in FIGS. 2-6. Chat application 967 may also manage automatic deletion of chat messages and other content message information as defined by system operation for ephemeral communications described above, where text messages in a group chat are automatically deleted following viewing by all group users. In other embodiments, this functionality may be integrated with another application such as a social media application 960 or another such application. In some embodiments, chat application 967 may manage collection of content using a camera device of machine 1100, communication with a server system via I/O components 1150, and receipt and storage of received messages in memory 1130 as part of communication of content messages. Presentation of messages and associated content may be managed by chat application 967 using different frameworks 908, library 906 elements, or operating system 904 elements operating on a machine 1100.

Figure 10:
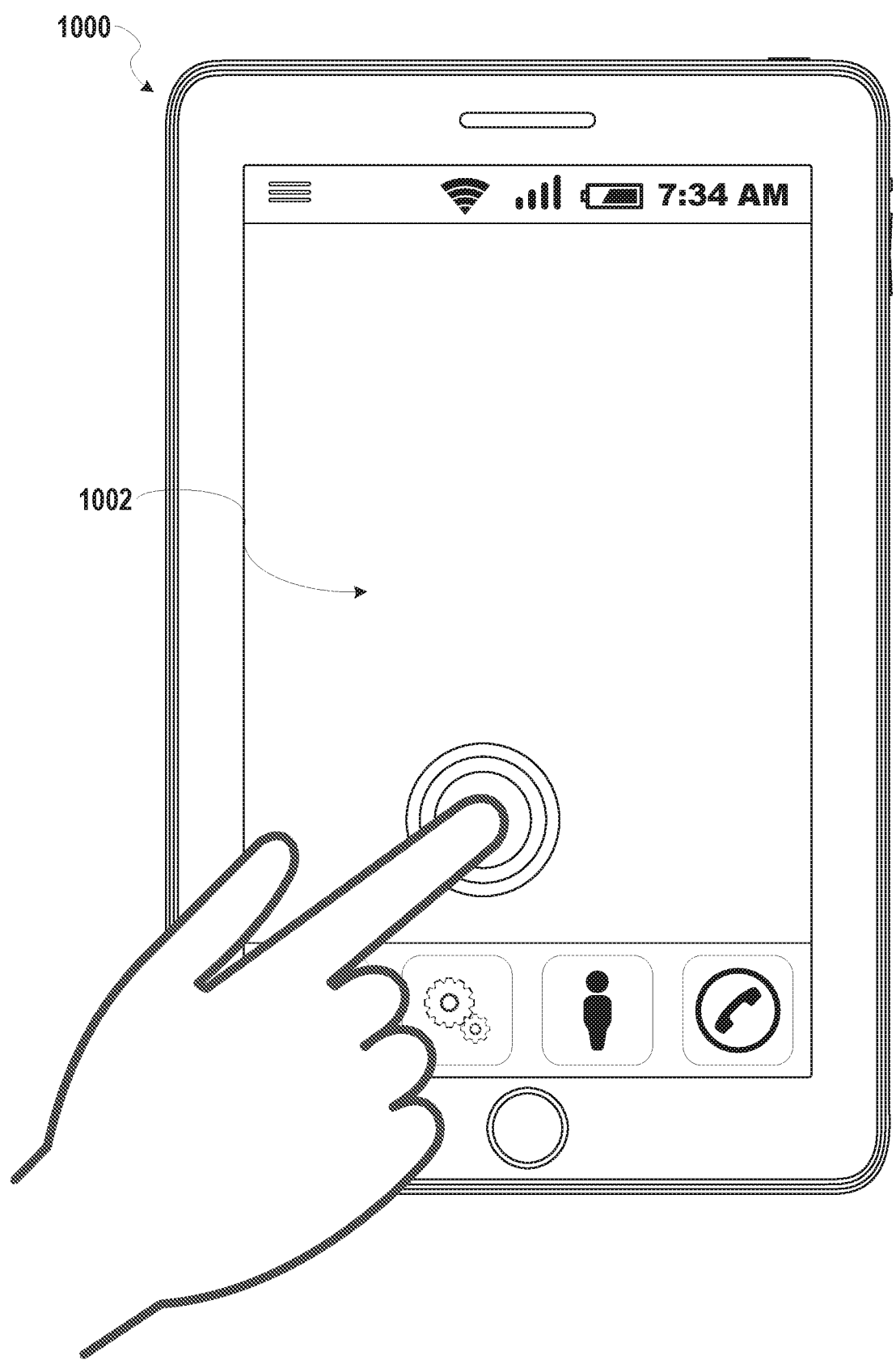
FIG. 10 illustrates aspects of an example client device that may be used with ephemeral group chat, according to some example embodiments.

FIG. 10 illustrates an example mobile device 1000 executing a mobile operating system (e.g., IOS™, ANDROID™, WINDOWS® Phone, or other mobile operating systems), consistent with some embodiments. Mobile device 1000 may implement software architecture 902 in certain embodiments. In one embodiment, the mobile device 1000 includes a touch screen operable to receive tactile data from a user. FIG. 10 shows a display area 1002 that may be used for group chat, text messages, and other such content. The user may physically touch the mobile device 1000, and in response to the touch, the mobile device 1000 may determine tactile data such as touch location, touch force, or gesture motion. In various example embodiments, the mobile device 1000 displays a home screen operable to launch applications 910 or otherwise manage various aspects of the mobile device 1000. In some example embodiments, the home screen provides status information such as battery life, connectivity, or other hardware statuses. The user can activate user interface elements by touching an area occupied by a respective user interface element. In this manner, the user interacts with the applications 910 of the mobile device 1000. For example, touching the area occupied by a particular icon included in the home screen causes launching of an application 910 corresponding to the particular icon.

In certain embodiments, content may be presented within the touch screen of mobile device 1000 operating as a client device 110, 120, and a touch input may be used to initiate a communication to a server system 150 as part of a group chat.

Many varieties of applications 910 (also referred to as "apps") can be executing on the mobile device 1000, such as native applications (e.g., applications programmed in Objective-C, Swift, or another suitable language running on IOS™, or applications 910 programmed in Java running on ANDROID™), mobile web applications (e.g., applications 910 written in Hypertext Markup Language-5 (HTML5)), or hybrid applications (e.g., a native shell application 910 that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app such as SNAPCHAT® that, consistent with some embodiments, allows users to send public content to a server system 550, and to receive messages from the server system 550. Such a SNAPCHAT application 910 may additionally enable exchange of various ephemeral image and/or video content messages in addition to group chat messages described herein.

Figure 11:
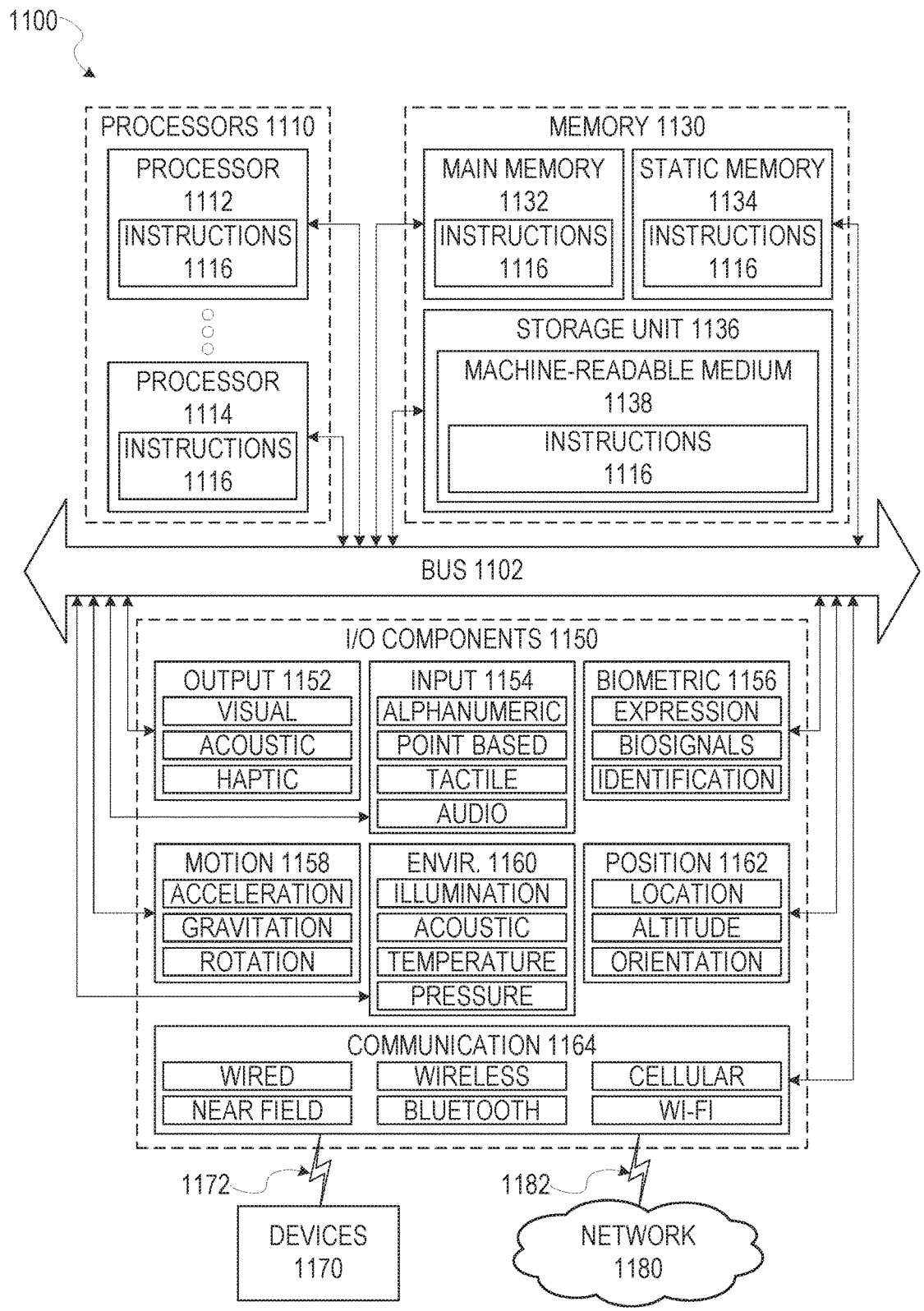
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application 910, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine 550 or a client device 110, 120 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 1000, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1110, 1112 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a USB).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a VPN, a LAN, a WLAN, a WAN, a WWAN, a MAN, the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a CDMA connection, a GSM connection, or other type of cellular or wireless coupling. In this example, the coupling may implement any of a variety of types of data transfer technology, such as 1xRTT, EVDO technology, GPRS technology, EDGE technology, 3GPP including 3G, 4G networks, UMTS, HSPA, WiMAX, LTE standard, others defined by various standard setting organizations, other long range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se, and may thus refer to non-transitory media.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day, sometimes accurate to a small fraction of a second). In some embodiments, a timestamp may be used as part of a deletion criteria or as a deletion trigger to determine a length of time since a message was generated or sent, and which is used for deletion of an ephemeral message (e.g., deletion of content from the ephemeral message from the communication system or client devices in the communication system.)

"DELETION TRIGGER" and "DELETION CRITERIA" refer to rules or states that, when identified by a device or aspect of a system, initiate the deletion of ephemeral content (e.g., text, images, video, metadata, etc.). In some embodiments, deletion of a piece of ephemeral content from an ephemeral message (e.g., a chat message) is associated with multiple criteria or criteria that occur at multiple different devices. Similarly, in some embodiments, ephemeral content is associated with multiple independent deletion triggers or criteria, such that a determination that a state associated with deletion occurs for any of the possible independent basis for deletion may be used to delete the ephemeral content, even while another state associated with deletion has not been met. In some embodiments, different ephemeral content may be associated with different sets of deletion triggers (e.g. deletion criteria). For example, a first ephemeral message may be associated with deletion trigger A, a second ephemeral message may be associated with deletion trigger B that is different than deletion trigger A, a third ephemeral message may be associated with deletion trigger (A and B), and a fourth ephemeral message may be associated with two deletion triggers, such that A or B will trigger the deletion.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAPCHAT, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   generating, at a server computer of a social network communication system, an association among at least three user accounts as part of a first ephemeral group chat, wherein the first ephemeral group chat is associated with a first deletion trigger indicating a first trigger condition;
   generating, at a server computer of a social network communication system, an association among at least three additional user accounts as part of a second ephemeral group chat, wherein the second ephemeral group chat is associated with a second deletion trigger indicating a second trigger condition;
   receiving, from a first client device associated with a first user account of the at least three user accounts, an ephemeral chat message;
   transmitting the ephemeral message from the server computer to client devices associated with the first ephemeral group chat and the second ephemeral group chat, the client devices comprising a second client device associated with a second user account of the at least three user accounts and a third client device associated with a third user account of the at least three additional user accounts;
   receiving, from the second client device, first chat monitoring information comprising first deletion trigger information;
   receiving, from the third client device, second chat monitoring information comprising second deletion trigger information;
   in response to the first deletion trigger information and the second deletion trigger information satisfying the first trigger condition, transmitting a deletion command to the second client device; and
   in response to the first deletion trigger information and the second deletion trigger information satisfying the second trigger condition, transmitting a deletion command to the third client device.

2. The method of claim 1 further comprising:
   in response to a threshold time passing since transmission of the first ephemeral message from the server computer, transmitting a deletion command to the second client device and the third client device.

3. The method of claim 1, wherein the first ephemeral chat message is associated with at least two deletion triggers; and
   wherein the first chat monitoring information comprises presence information and data associated with the at least two deletion triggers.

4. The method of claim 1, wherein the association between the at least three user accounts is further based on a previous entity relationship between the at least three user accounts and an ephemeral group chat creation message from a device associated with a user account of the at least three user accounts.

5. The method of claim 4, further comprising:
   receiving the ephemeral group chat creation message at the server computer;
   checking a list of user accounts identified in the ephemeral group chat creation message against a set of user accounts associated with active ephemeral group chat associations; and
   communicating a response to the ephemeral group chat creation message.

6. The method of claim 4, further comprising:
   automatically selecting a color assigned to each user account associated with the first ephemeral group chat as part of generation of the association between the at least three user accounts;

verifying a user device connections for at least a portion of the three or more user accounts;

communicating, based on the user device connections, the color assigned to each user account as part of the response to the ephemeral group chat creation message to corresponding devices identified by the user device connections for the three or more user accounts.

7. The method of claim 1, further comprising:

receiving, at the server computer, a plurality of presence communications associated with group chat activity, wherein the group chat activity is associated with the deletion trigger; and transmitting presence status updates to devices associated with the first group chat.

8. The method of claim 7, further comprising:

verifying, by the server computer, that a set of deletion criteria for the first ephemeral message has been met based on the plurality of presence communications; and in response to verification that the set of deletion criteria for the first ephemeral message has been met, communicating a deletion command to devices of the at least three user accounts.

9. The method of claim 8, further comprising:

communicating, from the server computer to the first client device, a verification message indicating that the set of deletion criteria for the first ephemeral message sent by the first client device has been met; and receiving, from the first client device, a deletion verification message prior to communicating the deletion command.

10. A device for ephemeral group chat comprising:

memory; and one or more processors coupled to the memory and configured to:

generate an association among at least three user accounts as part of first ephemeral group chat wherein the first ephemeral group chat is associated with a first deletion trigger indicating a first trigger condition;

generating, at a server computer of a social network communication system, an association among at least three additional user accounts as part of a second ephemeral group chat, wherein the second ephemeral group chat is associated with a second deletion trigger indicating a second trigger condition;

receive, from a first client device associated with a first user account of the at least three user accounts, an ephemeral chat message;

transmit the ephemeral message from the server computer to client devices associated with the first ephemeral group chat and the second ephemeral group chat, the client devices comprising a second client device associated with a second user account of the at least three user accounts and a third client device associated with a third user account of the at least three additional user accounts;

receive, from the second client device, first chat monitoring information comprising first deletion trigger information;

receive, from the third client device, second chat monitoring information comprising second deletion trigger information; and in response to the first deletion trigger information and the second deletion trigger information satisfying the first trigger condition, transmit a deletion command to the second client device; and in response to the first deletion trigger information and the second deletion trigger information satisfying the second trigger condition, transmitting a deletion command to the third client device.

11. The device of claim 10, wherein the first ephemeral chat message is associated with at least two deletion triggers;

wherein the chat monitoring information comprises presence information and data associated with the at least two deletion triggers; and wherein the one or more processors are further configured to verify that a set of deletion conditions associated with a first deletion trigger have been met based on the chat monitoring information, and to communicate a deletion command to devices associated with the at least three user accounts in response to verifying that the set of deletion conditions have been met.

12. The method of claim 1, wherein the first trigger condition is satisfied when the ephemeral chat message is displayed on a screen of the second client device for at least a threshold duration of time.

13. The method of claim 12, wherein the first deletion trigger information indicates the ephemeral chat message is displayed on the screen of the second client device for at least the threshold duration of time and the second deletion trigger information indicates the ephemeral chat message is displayed on the screen of the third client device for at least the threshold duration of time.

14. The method of claim 1, wherein the first trigger condition is met when the ephemeral chat message is displayed on a screen associated with each user account of the at least three user accounts other than the first user account for a threshold duration of time.

15. The method of claim 1, wherein the deletion command causes the second client device to delete the ephemeral chat message.

16. The method of claim 1, further comprising:

in response to both the first deletion trigger information and the second deletion trigger information satisfying the first trigger condition, transmitting the deletion command to the first client device.

17. The method of claim 1, wherein the first trigger condition is satisfied when the ephemeral chat message is displayed on a screen of the second client device for at least a first threshold duration of time and the ephemeral chat message is displayed on a screen of the third client device for at least a second threshold duration of time.

18. The method of claim 1, wherein the first deletion trigger information indicates the ephemeral chat message is deleted from the second client device and the second deletion trigger information indicates the ephemeral chat message is displayed on the screen of the third client device for at least the threshold duration of time.

19. The device of claim 10, wherein the first deletion trigger information indicates the ephemeral chat message was displayed on the screen of the second client device for at least the threshold duration of time and that a user of the second client device was present within a time frame of when the ephemeral chat message was displayed, and the second deletion trigger information indicates the ephemeral chat message was displayed on the screen of the third client device for at least the threshold duration of time and that a user of the third client device was present within a time frame of when the ephemeral chat message was displayed.

20. A non-transitory computer readable medium comprising instructions that, when executed by one or more processors of a device, cause the device to implement ephemeral group chat by configuring the device to:
- generate an association among at least three user accounts as part of an ephemeral group chat;
- receive, from a first client device associated with a first user account of the at least three user accounts, an ephemeral chat message associated with a deletion trigger, the deletion trigger indicating a trigger condition;
- transmitting the ephemeral message from the server computer to client devices associated with the ephemeral group chat, the client devices comprising a second client device associated with a second user account of the at least three user accounts and a third client device associated with a third user account of the at least three user accounts;
- receive, from the second client device, first chat monitoring information comprising first deletion trigger information;
- receive, from the third client device, second chat monitoring information comprising second deletion trigger information;
- in response to receiving, from the second client device, a response to the ephemeral message, modifying the trigger condition to include an extended condition; and
- in response to the first deletion trigger information and the second deletion trigger information satisfying the trigger condition and the extended condition being satisfied, transmit a deletion command to the second client device and the third client device.

21. The non-transitory computer readable medium of claim 20, wherein the first trigger condition is satisfied when the ephemeral chat message is displayed on a screen of the second client device for at least a threshold duration of time and the ephemeral chat message is displayed on a screen of the third client device for at least the threshold duration of time.

* * * * *